United States Patent
Kodaira et al.

(10) Patent No.: US 8,993,085 B2
(45) Date of Patent: Mar. 31, 2015

(54) RECORDABLE OPTICAL RECORDING MEDIUM HAVING RECORDING LAYER CONTAINING ORGANIC DYE

(75) Inventors: Takuo Kodaira, Tokyo (JP); Isao Matsuda, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 14/001,153

(22) PCT Filed: Feb. 9, 2012

(86) PCT No.: PCT/JP2012/052925
§ 371 (c)(1),
(2), (4) Date: Sep. 6, 2013

(87) PCT Pub. No.: WO2012/114883
PCT Pub. Date: Aug. 30, 2012

(65) Prior Publication Data
US 2014/0030550 A1    Jan. 30, 2014

(30) Foreign Application Priority Data
Feb. 24, 2011   (JP) .................. 2011-038220

(51) Int. Cl.
| | | |
|---|---|---|
| G11B 7/24 | (2013.01) | |
| G11B 7/2467 | (2013.01) | |
| G11B 7/24056 | (2013.01) | |
| G11B 7/249 | (2013.01) | |
| C09B 45/18 | (2006.01) | |
| C09B 45/20 | (2006.01) | |
| C09B 45/22 | (2006.01) | |

(52) U.S. Cl.
CPC .......... *G11B 7/2467* (2013.01); *G11B 7/24056* (2013.01); *G11B 7/249* (2013.01); *C09B 45/18* (2013.01); *C09B 45/20* (2013.01); *C09B 45/22* (2013.01)

USPC .... 428/64.1; 428/64.4; 428/64.8; 430/270.14

(58) Field of Classification Search
USPC .................... 428/64.8; 430/270.14
See application file for complete search history.

(56) References Cited

U.S. PATENT DOCUMENTS

| | | |
|---|---|---|
| 2009/0263611 A1 | 10/2009 | Miyazawa et al. |
| 2010/0002569 A1 | 1/2010 | Nagase et al. |
| 2011/0202942 A1 | 8/2011 | Fujimoto et al. |

FOREIGN PATENT DOCUMENTS

| | | |
|---|---|---|
| JP | 2007-045147 A | 2/2007 |
| JP | 2008-269703 A | 11/2008 |
| JP | 2009-026379 A | 2/2009 |
| JP | 2010-015612 A | 1/2010 |
| JP | 2010-023384 A | 2/2010 |
| JP | 2010-033667 A | 2/2010 |
| JP | 2010-111120 A | 5/2010 |

OTHER PUBLICATIONS

International Search Report from the International Bureau of WIPO for International Application No. PCT/JP2012/052925 dated May 22, 2012 (2 pages).

*Primary Examiner* — Elizabeth Mulvaney
(74) *Attorney, Agent, or Firm* — Saliwanchik, Lloyd & Eisenschenk

(57) ABSTRACT

A recordable optical recording medium is provided enabling the light transmission layer to be a single layer, the inhibition of peeling of the recording layer even when stored in high-temperature/high-moisture conditions, and the reduction of degradation of the recording/reproduction characteristics. A recordable optical recording medium provided with a substrate, and, on the substrate in the following order, a reflective layer, a recording layer, a protective layer, and a light transmission layer. The optical recording medium has the recording layer formed thereon using an organic dye obtained by adding a highly waterproof, low hydrophilic organic dye to a triazole-based azo metal complex dye.

10 Claims, 1 Drawing Sheet

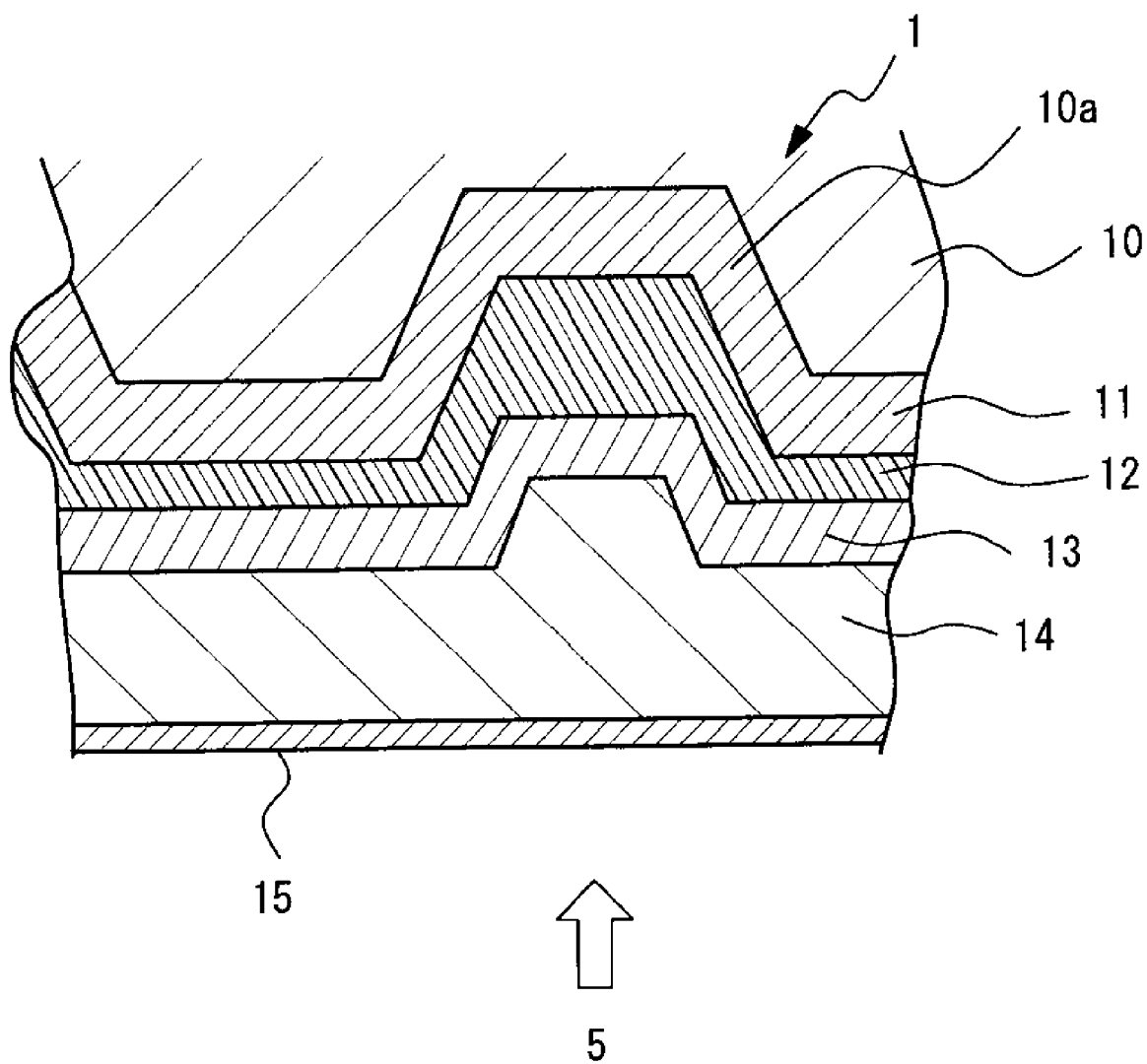

RECORDABLE OPTICAL RECORDING MEDIUM HAVING RECORDING LAYER CONTAINING ORGANIC DYE

TECHNICAL FIELD

The present invention relates to an LTH (Low to High) type recordable optical recording medium having a recording layer containing an organic dye and capable of recording/reproducing data with a light having a wavelength of 300 nm to 500 nm, and in particular, relates to an LTH (Low to High) type recordable optical recording medium having a recording layer containing an organic dye, capable of recording and reproducing data with a light having a wavelength of 300 nm to 500 nm, enabling the light transmission layer to be a single layer and having no degradation of the recording/reproduction characteristics even when stored in high-temperature/high-moisture conditions.

BACKGROUND ART

In the related art, an LTH (Low to High) type recordable optical recording medium, so called one of blue ray discs, having a recording layer containing an organic dye and capable of recording/reproducing data with a light having a wavelength of 300 nm to 500 nm has a double-layered light transmission layer. In other words, an outer light transmission layer is formed of a hard material for preventing the optical recording media from scratching similar to a light transmission layer of a recordable optical recording medium having a recording layer containing an inorganic material. An internal light transmission layer is formed of a soft material having low elastic modulus such as an acrylic resin and a gluing agent for absorbing and accepting a deformation of the recording layer caused by heat generation and inflation of the organic dye upon data storing, inducing a change of reflectance by a difference in an optical path length accompanied by the deformation of the recording layer and ensuring recording characteristics.

Patent Document 1: Japanese Patent Application Laid-open No. 2010-33667
Patent Document 2: Japanese Patent Application Laid-open No. 2009-26379
Patent Document 2: Japanese Patent Application Laid-open No. 2008-269703

SUMMARY OF INVENTION

Problem to be Solved by the Invention

Thus, in the recordable optical recording medium having the double-layered light transmission layer, the internal light transmission layer being formed of a soft material having low elastic modulus such as an acrylic resin and a gluing agent, the deformation of the recording layer caused by the heat generation and the inflation of the organic dye upon data storing is absorbed by the internal light transmission layer, whereby almost no stress is advantageously induced within the optical recording medium.

However, when the light transmission layer is double-layered, costs of the optical recording medium are increased. It is desirable that a blue ray disc type recordable optical recording medium having a recording layer formed using an organic dye have a single-layered light transmission layer similar to a blue ray disc type recordable optical recording medium having a recording layer formed using an inorganic dye. As an organic dye being capable of providing the blue ray disc type recordable optical recording medium including the single-layered optical recording medium having excellent recording/reproducing characteristics, an azo metal complex dye having a specific molecular structure has been found.

In the blue ray disc type recordable optical recording medium having the recording layer formed using the azo metal complex dye, the recording/reproducing characteristics can be improved compared with the blue ray disc type recordable optical recording medium having the recording layer formed using the organic dye in the related art. Still, it is difficult for the single-layered light transmission layer to fully absorb and receive the deformation of the recording layer upon data storing. A stress generated when a recoding pit is formed remains within the optical recording medium. When the optical recording layer is stored in high-temperature/high-moisture conditions, a part of the recording layer is undesirably peeled to degrade the recording/reproduction characteristics caused by a residual stress.

Accordingly, an object of the present invention is to provide an LTH (Low to High) type recordable optical recording medium having a recording layer containing an organic dye, capable of recording/reproducing data with a light having a wavelength of 300 nm to 500 nm, enabling the light transmission layer to be a single layer, inhibiting the recording layer from peeling even when stored in high-temperature/high-moisture conditions, and decreasing degradation of the recording/reproduction characteristics.

Means for Solving the Problem

As a result of intense studies by the present inventors in order to achieve the object, it is found that the recording layer is not peeled not in the high-temperature/high-moisture conditions, and that the recording layer is peeled only when it is stored in the high-moisture conditions. Through further intensive studies, the followings are found. As the above-described azo metal complex dye contained in the recording layer has high affinity for water, when the optical recording medium is stored in the high-moisture conditions, the azo metal complex dye contained in the recording layer holds water molecules, and a binding property between the recording layer and a protective layer is decreased. The phenomenon is caused by a part peeling of the recording layer owing to the stress generated when the recoding pit is formed. A high water-proof dye is mixed with the azo metal complex dye forming the recording layer to improve waterproofness of the recording layer and to decrease the affinity for water, whereby a decrease of the binding property between the recording layer and the protective layer can be inhibited. Even when the optical recording medium is stored in the high-moisture conditions, a part peeling of the recording layer can be inhibited.

The present invention is based on such discoveries. The object of the present invention can be achieved by a recordable optical recording medium including a substrate on which at least a reflective layer, a recording layer and a light transmission layer are provided, characterized in that the recording layer is formed by adding a low hydrophilic and highly water-proof organic dye to a triazole-based azo metal complex dye represented by the following general formula (1) and using the resultant organic dye to form the recording layer.

[Chemical formula 1]

General formula (1)

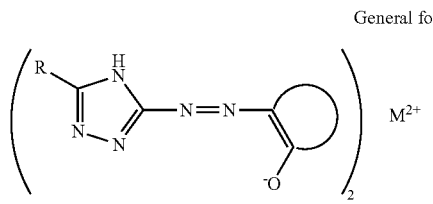

In a general formula (1), R is a functional group selected from the group consisting of a hydrogen atom, an alkyl group having four or less carbon atoms, a benzyl group, a diethylamido group, a halogen group, a trifluoro methyl group, a methoxy group, a thiomethyl group and N,N-diethyl carbamoyl group; the alkyl group may have a straight chain alkyl, branched chain alkyl or cyclic structure; and M is a metal atom selected from the group consisting of nickel, cobalt and copper.

In the present invention, a cyclic part of the general formula (1) preferably has the structure shown by the following general formula (5).

[Chemical formula 2]

General formula (5)

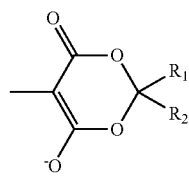

In the general formula (5), $R_1$ and $R_2$ are each an alkyl group that may have the cyclic structure. The cyclic structure may have a substituent or substituents.

In the present invention, the cyclic part of the triazole-based azo metal complex dye represented by the general formula (5) preferably has the structure shown by either of the following general formulae (a) to (j):

[Chemical formula 3]

General formula (a)

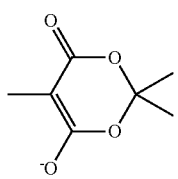

[Chemical formula 4]

General formula (b)

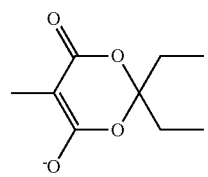

[Chemical formula 5]

General formula (c)

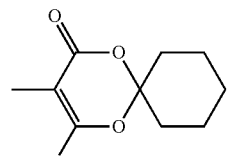

[Chemical formula 6]

General formula (d)

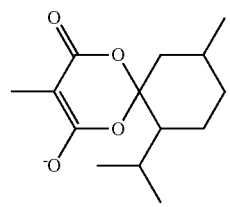

[Chemical formula 7]

General formula (e)

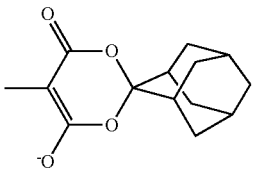

[Chemical formula 8]

General formula (f)

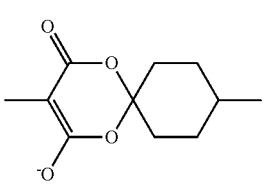

[Chemcial formula 9]

General formula (g)

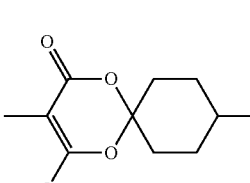

[Chemical formula 10]

General formua (h)

[Chemical formula 11]

General Formula (i)

[Chemical formula 12]

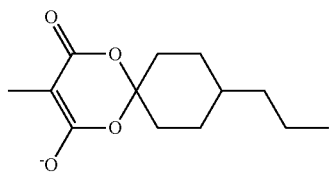

General formula (j)

In the present invention, the low hydrophilic and highly waterproof organic dye preferably has an optical density ratio (OD2/OD1) of 60 wt % or more, the optical density (OD1) being at a maximum absorption wavelength (λmax) before a dye thin film is immersed into hot water of 75° C., and the optical density (OD2) being at the maximum absorption wavelength (λmax) after the dye thin film is immersed into the hot water for 30 minutes.

In the present invention, the low hydrophilic and highly waterproof organic dye is preferably selected from the group consisting of the organic dyes represented by the following structural formulae (11) to (19):

[Chemical formula 13]

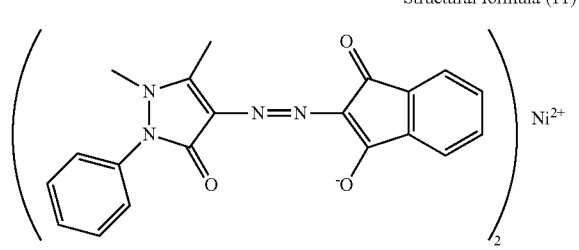

Structural formula (11)

[Chemical formula 14]

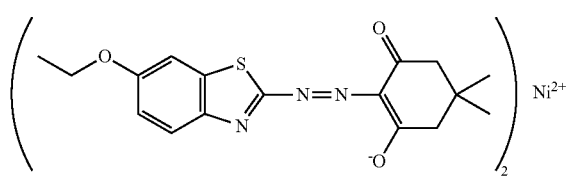

Structural formula (12)

[Chemical formula 15]

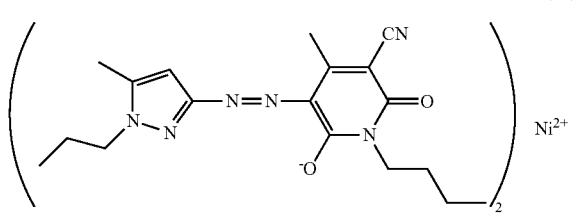

Structural formula (13)

[Chemical formula 16]

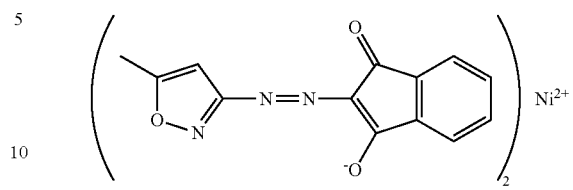

Structural formula (14)

[Chemical formula 17]

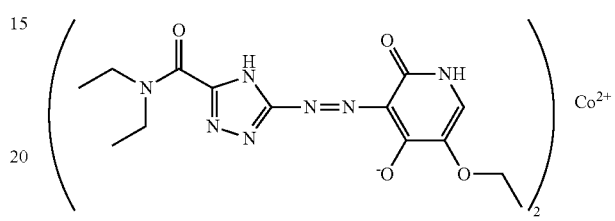

Structural formula (15)

[Chemical formula 18]

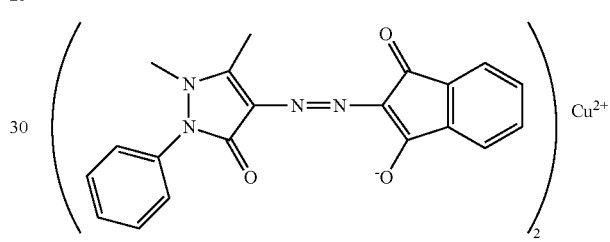

Structural formula (16)

[Chemical formula 19]

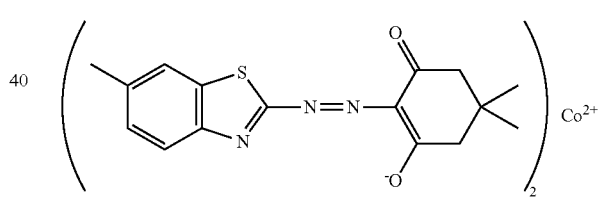

Structural formula (17)

[Chemical formula 20]

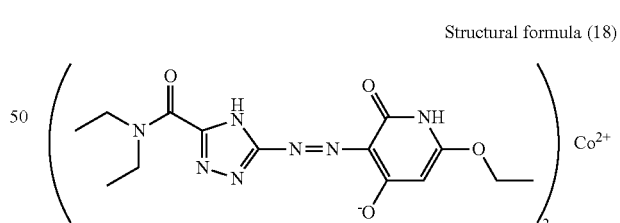

Structural formula (18)

[Chemical formula 21]

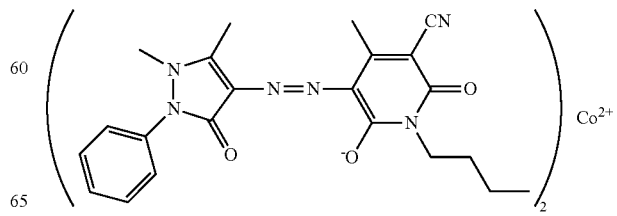

Structural formula (19)

In the present invention, the triazole-based azo metal complex dye preferably has a molecular structure selected from the following structural formulae (21) to (29):

[Chemical formula 22]

Structural formula (21)

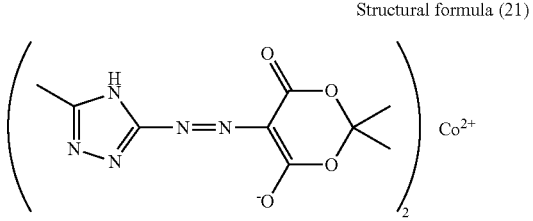

[Chemical formula 23]

Structural formula (22)

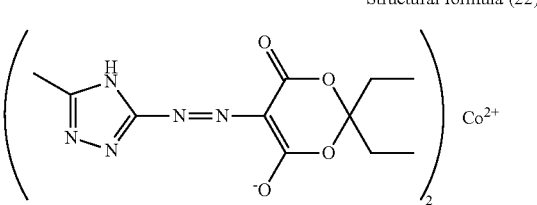

[Chemical formula 24]

Structural formula (23)

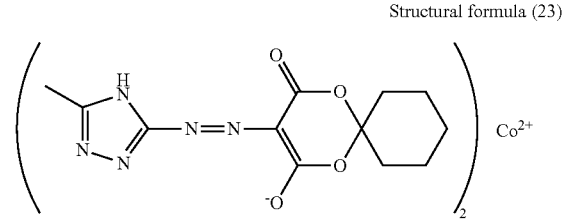

[Chemical formula 25]

Structural formula (24)

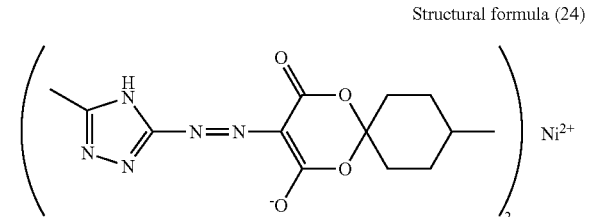

[Chemical formula 26]

Structural formula (25)

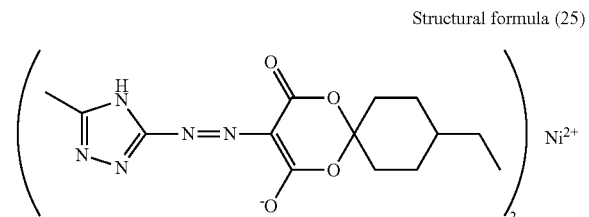

[Chemical formula 27]

Structural formula (26)

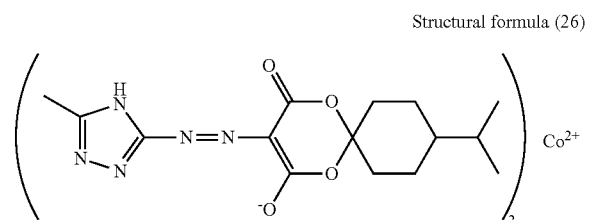

[Chemical formula 28]

Structural formula (27)

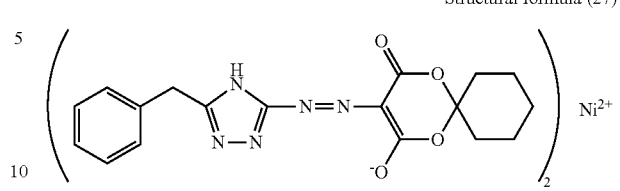

[Chemical formula 29]

Structural formula (28)

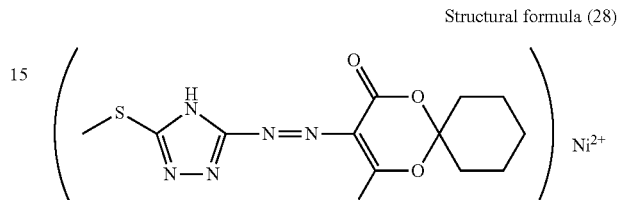

[Chemical formula 30]

Structural formula (29)

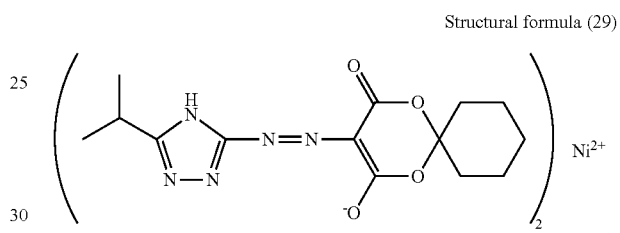

In the present invention, an additive amount of the low hydrophilic and highly waterproof organic dye added to the triazole-based azo metal complex dye is preferably 3 wt % to 25 wt % based on the total organic dye contained in the recording layer. If the additive amount of the organic dye added is less than 3 wt %, a part of the recording layer will be peeled when the optical recording medium is stored in the high-temperature/high-moisture conditions, whereby inhibiting the degradation of the recording/reproduction characteristics in the optical recording medium is difficult. On the other hand, if the additive amount of the organic dye added exceeds 25 wt %, the recording/reproduction characteristics in the optical recording medium will be undesirably degraded.

According to the preferable embodiment of the present invention, the light transmission layer is a single layer.

According to the more preferable embodiment of the present invention, the light transmission layer has elastic modulus of 40 MPa or more and 10000 MPa or less at 25° C.

According to the preferable embodiment of the present invention, the recordable optical recording medium includes a protective layer formed of a dielectric material between the recording layer and the light transmission layer.

According to the preferable embodiment of the present invention, the recordable optical recording medium includes a hard coat layer formed on a surface of the light transmission layer at an opposite side of the protective layer.

Effect of the Invention

According to the present invention, it is possible to provide an LTH (Low to High) type recordable optical recording medium having a recording layer containing an organic dye, capable of recording and reproducing data with a light having a wavelength of 300 nm to 500 nm, enabling the light transmission layer to be a single layer and having no degradation of the recording/reproduction characteristics even when stored in high-temperature/high-moisture conditions.

BRIEF DESCRIPTION OF THE DRAWINGS

FIG. 1 is a schematic longitudinal sectional view of a recordable optical recording medium according to a preferable embodiment of the present invention.

MODES FOR CARRYING OUT THE INVENTION

FIG. 1 is a schematic longitudinal sectional view of an LTH (Low to High) type recordable optical recording medium according to a preferable embodiment of the present invention.

As shown in FIG. 1, the LTH (Low to High) type recordable optical recording medium 1 according to the embodiment includes a substrate 10 and, on the substrate 10 in the following order, a reflective layer 11, a recording layer 12, a protective layer 13, a single-layered light transmission layer 14, and a hard coat layer 15.

In the embodiment, a recording laser beam 5 for recording data on the recording layer 12 of the optical recording medium 1 and a reproducing laser beam 5 for reproducing the data recorded on the recording layer 12 are configured to be irradiated from a surface of the hard coat layer 15 to the optical recording medium 1.

Although not shown in FIG. 1, the recordable optical recording medium 1 according to the embodiment has a circular plate shape, and a center hole is formed at a center part.

The substrate 10 has the circular plate shape, functions as a support for assuring a mechanical strength required by the optical recording medium 1, and has a thickness of about 1.1 mm and a diameter of 120 mm.

A material for forming the substrate 10 is not especially limited as long as the mechanical strength required by the optical recording medium 1 can be assured. The substrate 10 may be formed of a metal such as aluminum, glass, ceramics, a resin and the like. Among them, the resin, in particular, a thermoplastic resin is preferably used from the standpoint of formability, moisture resistance, dimensional stability and costs. Examples of the resin for forming the substrate 10 include polycarbonate resins; acrylic resins such as polymethyl methacrylate; vinyl chloride-based resins such as polyvinyl chloride and a vinyl chloride copolymer; epoxy resins; amorphous polyolefin resins; polyester resins and the like. Among them, the polycarbonate resins are especially preferable.

As shown in FIG. 1, a spiral guide groove 10a is formed on a surface of the substrate 10. The spiral guide groove 10a can be formed by injection molding the substrate 10 using a mold on which a stamper is set. The guide groove 10a is formed in a pitch of 0.35 μm or 0.32 μm.

As shown in FIG. 1, the reflective layer 11 is formed by sputtering etc. on the surface of the substrate 10 at the side of the spiral guide groove 10a formed. The reflective layer 11 has a function to reflect the laser beam, which is irradiated to the optical recording medium 1 and transmitted through the recording layer 12, on the recording layer 12, and is generally formed of a metal having high reflectance such as an Ag alloy and an Al alloy. According to the embodiment, the reflective layer 11 is formed of the Ag alloy.

The recording layer 12 is formed on the surface of the reflective layer 11, and is formed of an organic substance containing the organic dye. The recording layer 12 is formed by coating and drying an organic substance solution containing the organic dye on the surface of the reflective layer 11 using spin coating.

In the present invention, the recording layer 12 is formed of a mixed organic dye obtained by adding the low hydrophilic and highly waterproof organic dye to the triazole-based azo metal complex dye represented by the above-described general formula (1). In the above-described general formula (1), the cyclic part is composed of a carbon atom, an oxygen atom and a hydrogen atom; R is a functional group selected from the group consisting of a hydrogen atom, an alkyl group having four or less carbon atoms, a benzyl group, a diethylamido group, a halogen group, a trifluoro methyl group, a methoxy group, a thiomethyl group and N,N-diethyl carbamoyl group; the alkyl group may have a straight chain alkyl, branched chain alkyl or cyclic structure; and M is a metal atom selected from the group consisting of nickel, cobalt and copper.

In the present invention, the cyclic part in the general formula (1) has preferably the structure represented by the above-described general formula (5). In the general formula (5), $R_1$ and $R_2$ are each an alkyl group that may have the cyclic structure. The cyclic structure may have a substituent or substituents.

In the present invention, the cyclic part of the triazole-based azo metal complex dye represented by the above-described general formula (5) more preferably has the structure shown by either of the above-mentioned general formulae (a) to (j).

In the present invention, the low hydrophilic and highly waterproof organic dye is preferably selected from the group consisting of the organic dyes represented by the above-mentioned structural formulae (11) to (19).

In the present invention, the triazole-based azo metal complex dye preferably has the molecular structure selected from the above-described structural formulae (21) to (29).

In the present invention, the additive amount of the organic dye added is preferably 3 wt % to 25 wt % based on the total organic dye contained in the recording layer 12.

In the embodiment, the recording layer 12 is formed by adding the organic dye represented by the above-described structure (11) to the triazole-based azo metal complex dye with the cyclic structure having the molecular structure represented by the above-described general formula (a), dissolving it to 2,2,3,3-tetrafluoro-1-propanol (TFP), and coating the surface of the reflective layer 11 with the resultant organic substance solution by a spin coating method. In the embodiment, the organic substance solution containing the organic dye is prepared by mixing 90 wt % of the triazole-based azo metal complex dye and 10 wt % of the organic dye.

The protective layer 13 is formed on the surface of the recording layer 12.

The protective layer 13 is for preventing a diffusion of the organic dye contained in the recording layer 12 over the light transmission layer 14 when the light transmission layer 14 is formed, and also for preventing a miscible phenomenon that a solvent of a photocurable resin used when the light transmission layer 14 is formed is permeated into the recording layer 12.

A material for forming the protective layer 13 is not especially limited as long as it is a transparent dielectric material. Examples include oxides such as silicon oxide (particularly preferably, silicon dioxide), zinc oxide, cerium oxide, yttrium oxide, indium oxide-tin oxide (ITO); sulfides such as zinc sulfide and yttrium sulfide; nitrides such as silicon nitride; and a mixture of the oxides and a sulfuric compound. In the embodiment, the protective layer 13 is formed of the indium oxide-tin oxide (ITO) by sputtering etc.

On the surface of the protective layer 13, the single-layered light transmission layer is formed.

The light transmission layer 14 is formed by coating the surface of the protective layer 13 with the photocurable resin, which is cured by irradiating ultraviolet rays or radiation, by the spin coating method to form a coated film, and by irradiating the coated film with ultraviolet rays or radiation to cure the coated film.

According to the embodiment, the light transmission layer 14 is formed by the photocurable resin having elastic modulus of 40 MPa or more and 10000 MPa or less at 25° C.

In the embodiment, a combined thickness of the light transmission layer 14 and the hard coat layer 15 formed on the light transmission layer 14 is set to 100 μm.

The light transmission layer 14 has light transmittance to a light having a wavelength of 405 nm of 70% or more, preferably 80% or more measured by a spectrophotometer at a wavelength of 405 nm.

As shown in FIG. 1, the hard coat layer 15 is formed on the surface of the light transmission layer 14 in order to physically protect the light transmission layer 14 and prevent the light transmission layer 14 from damaging.

A material for forming the hard coat layer 15 is not especially limited, but may be preferably excellent in transparency and abrasion resistance. The hard coat layer 15 is preferably formed by coating a resin composition including an ultraviolet curable resin to which inorganic particles are added over the surface of the light transmission layer 14 by the spin coating method.

Preferably, the hard coat layer 15 has a thickness of 1 μm to 5 μm.

When data is recorded on the optical recording medium 1 thus configured, the optical recording medium 1 is irradiated with the laser beam 5 having a wavelength of 350 nm to 500 nm from a hard coat layer 15 side. The laser beam 5 is transmitted through the single-layered light transmission layer 14 and the protective layer 13 and is incident on the recording layer 12; or is transmitted through the recording layer 12, is reflected by the reflective layer 11, and is incident on the recording layer 12.

As a result, the organic dye contained in the part of the recording layer 12 irradiated with the laser beam 5 is decomposed. The reflectance of the part is increased. In this way, the recoding pit is formed and the data is written into the optical recording medium 1.

According to the embodiment, as the recording layer 12 formed on the surface of the reflective layer 11 contains 90 wt % of the triazole-based azo metal complex dye and 10 wt % of the low hydrophilic and highly waterproof organic dye, the azo metal complex dye contained in the recording layer 12 holds less water molecules when stored in high-temperature/high-moisture conditions. Thus, the binding property between the recording layer 12 and the protective layer 13 is effectively prevented from decreasing.

Accordingly, it is possible to prevent the recording/reproducing property of the optical recording medium 1 from deteriorating, which is caused by a part peeling of the recording layer 12, even when the optical recording medium 1 is stored in high-temperature/high-moisture conditions for a prolonged time.

EXAMPLES

Examples and Comparative Examples will be given below to further illustrate the effect of the present invention.

Example 1

A circular plate shaped substrate was injection molded from a polycarbonate resin having an outer diameter of 120 mm and a thickness of 1.1 mm on which a spiral guide groove was formed at a pitch of 0.32 μm.

An Ag alloy reflective layer was formed on a surface of the substrate at the side of the guide groove formed, and a track corresponding to the guide groove having a depth of 45 nm and a width of 160 nm was formed on a surface of the reflective layer.

Next, 10 wt % of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

The organic dye solution thus obtained was coated over the surface of the reflective layer by the spin coating method to form a coated film. The coated film was dried at a temperature of 80° C. for 10 minutes to form a recording layer such that an optical density (an OD value) was 0.25 at a maximum absorption wavelength ($\lambda$max=370 nm). The OD value refers to the optical density of the substrate on which the recording layer is directly formed on the substrate without forming the reflective layer, and the OD value=0 indicates the optical density of the substrate alone.

A dye solution containing an organic dye dissolved in 2,2,3,3-tetrafluoro-1-propanol (TFP) was coated over the surface of the polycarbonate substrate for test by the spin coating method to form a dye film, which was immersed into a hot water at 75° C. for 30 minutes. By a remaining percentage of the dye, waterproofness of the organic dye was evaluated. The remaining percentage of the triazole-based azo metal complex dye represented by the above-described structural formula (21) was 25 wt %, which had low waterproofness. On the other hand, the remaining percentage of the organic dye represented by the above-described structural formula (11) was 80 wt %, which had high waterproofness. The remaining percentage of the dye was defined by a ratio of the optical density at a maximum absorption wavelength ($\lambda$max) before immersing into hot water and the optical density at the maximum absorption wavelength ($\lambda$max) after immersing into the hot water.

Further, a protective layer containing an indium oxide—tin oxide (ITO) was formed on the surface of the recording layer at a thickness of 20 nm by the sputtering.

Next, an acrylic resin based ultraviolet curable resin was coated over the surface of the protective layer by the spin coating method to form a coated film. The coated film was irradiated with ultraviolet rays, and cured, thereby forming a single-layered light transmission layer having a thickness of 97 μm. After curing, the light transmission layer had elastic modulus of 2300 MPa at 25° C. For measurement of elasticity, a dynamic viscoelasticity measuring apparatus RMAIII manufactured by TA Instruments was used. A test specimen was provided by coating a sample resin on a disc at 100 μm, curing it, peeling the resin from the disc, and cutting into a size of 5 mm×50 mm. Further, a resin composition including an ultraviolet curable resin to which inorganic particles were added was coated over the surface of the light transmission layer by the spin coating method to form a coated film. The coated film was irradiated with ultraviolet rays, and cured, thereby forming a hard coat layer having a thickness of 3 μm.

In this way, an optical recording medium sample No. 1 was prepared.

Next, the resultant optical recording medium sample No. 1 was set to a data recording/reproducing apparatus "ODU-1000" (trade name) manufactured by Pulstec Industrial Co., Ltd. While the apparatus was rotated at a line speed of 19.67 m/sec (4× speed recording), the data was recorded by irradiating the recording layer with the laser beam having a wavelength of 405 nm via the light transmission layer using an objective lens having an NA of 0.85 by changing a power of the laser beam.

From the data thus recorded on the optical recording medium sample No. 1, a recording signal was reproduced using the above-described data recording/reproducing apparatus and reproducing property was evaluated. The power of the laser beam (optimum laser power) where a DC jitter of a reproduction signal became the smallest was 8.6 mW.

Next, by using the above-described data recording/reproducing apparatus and fixing the power of the laser beam to 0.35 mW, the data recorded on the optical recording medium sample No. 1 was reproduced and the reproduction signal was evaluated. The DC jitter was 8.5%.

Further, using the above-described data recording/reproducing apparatus, an entire surface of the optical recording medium sample No. 1 was irradiated with the laser beam having the power 10% higher than the optimum laser power, and the data was recorded over the entire surface of the optical recording medium sample No. 1.

The optical recording medium sample No. 1 thus obtained was left in high-temperature/high-moisture conditions, i.e., at a temperature of 80° C. and a humidity of 80%, for 100 hours, to conduct high temperature and high humidity test conforming to ISO.

After the high temperature and high humidity test, the entire surface of the optical recording medium sample No. 1 was observed with a microscope. A delamination diameter of 10 micrometers to 3 millimeters was observed between the protective layer and the recording layer at 32 points.

Example 2

An optical recording medium sample No. 2 was prepared similar to Example 1 except that the triazole-based azo metal complex dye represented by the above-described structural formula (22) was used in place of the triazole-based azo metal complex dye represented by the above-described structural formula (21).

The recording layer was formed such that the optical density (the OD value) was 0.25 at a maximum absorption wavelength ($\lambda$max=373 nm).

Waterproofness of the triazole-based azo metal complex dye represented by the above-described structural formula (22) was evaluated. The remaining percentage of the dye was 28 wt %, which had low waterproofness. On the other hand, the remaining percentage of the organic dye represented by the above-described structural formula (11) was 80 wt %, which had high waterproofness.

In the optical recording medium sample No. 2 thus prepared, data was recorded and reproduced similar to Example 1. The optimum laser power was 9.0 mW.

Next, by fixing the power of the laser beam to 0.35 mW, the data recorded on the optical recording medium sample No. 2 was reproduced and the reproduction signal was evaluated. The DC jitter was 8.7%.

Further, an entire surface of the optical recording medium sample No. 2 was irradiated with the laser beam having the power 10% higher than the optimum laser power, and the data was recorded over the entire surface of the optical recording medium sample No. 2. The high temperature and high humidity test conforming to ISO was conducted. After the high temperature and high humidity test, the entire surface of the optical recording medium sample No. 2 was observed with a microscope. A delamination diameter of 10 micrometers to 3 millimeters was observed between the protective layer and the recording layer at 27 points.

Example 3

An optical recording medium sample No. 3 was prepared similar to Example 1 except that the triazole-based azo metal complex dye represented by the above-described structural formula (23) was used in place of the triazole-based azo metal complex dye represented by the above-described structural formula (21).

The recording layer was formed such that the optical density (the OD value) was 0.25 at a maximum absorption wavelength ($\lambda$max=379 nm).

Waterproofness of the triazole-based azo metal complex dye represented by the above-described structural formula (23) was evaluated. The remaining percentage of the dye was 34 wt %, which had low waterproofness. On the other hand, the remaining percentage of the organic dye represented by the above-described structural formula (11) was 80 wt %, which had high waterproofness.

In the optical recording medium sample No. 3 thus prepared, data was recorded and reproduced similar to Example 1. The optimum laser power was 8.8 mW.

Next, by fixing the power of the laser beam to 0.35 mW, the data recorded on the optical recording medium sample No. 3 was reproduced and the reproduction signal was evaluated. The DC jitter was 8.8%.

Further, an entire surface of the optical recording medium sample No. 3 was irradiated with the laser beam having the power 10% higher than the optimum laser power, and the data was recorded over the entire surface of the optical recording medium sample No. 3. The high temperature and high humidity test conforming to ISO was conducted. After the high temperature and high humidity test, the entire surface of the optical recording medium sample No. 3 was observed with a microscope. A delamination diameter of 10 micrometers to 3 millimeters was observed between the protective layer and the recording layer at 10 points.

Example 4

An optical recording medium sample No. 4 was prepared similar to Example 1 except that the triazole-based azo metal complex dye represented by the above-described structural formula (24) was used in place of the triazole-based azo metal complex dye represented by the above-described structural formula (21).

The recording layer was formed such that the optical density (the OD value) was 0.25 at a maximum absorption wavelength ($\lambda$max=379 nm).

Waterproofness of the triazole-based azo metal complex dye represented by the above-described structural formula (24) was evaluated. The remaining percentage of the dye was 36 wt %, which had low waterproofness. On the other hand, the remaining percentage of the organic dye represented by the above-described structural formula (11) was 80 wt %, which had high waterproofness.

In the optical recording medium sample No. 4 thus prepared, data was recorded and reproduced similar to Example 1. The optimum laser power was 8.6 mW.

Next, by fixing the power of the laser beam to 0.35 mW, the data recorded on the optical recording medium sample No. 4 was reproduced and the reproduction signal was evaluated. The DC jitter was 8.2%.

Further, an entire surface of the optical recording medium sample No. 4 was irradiated with the laser beam having the power 10% higher than the optimum laser power, and the data was recorded over the entire surface of the optical recording medium sample No. 4. The high temperature and high humidity test conforming to ISO was conducted. After the high temperature and high humidity test, the entire surface of the optical recording medium sample No. 4 was observed with a microscope. A delamination diameter of 10 micrometers to 3 millimeters was observed between the protective layer and the recording layer at 24 points.

Example 5

An optical recording medium sample No. 5 was prepared similar to Example 1 except that the triazole-based azo metal complex dye represented by the above-described structural formula (25) was used in place of the triazole-based azo metal complex dye represented by the above-described structural formula (21).

The recording layer was formed such that the optical density (the OD value) was 0.25 at a maximum absorption wavelength ($\lambda$max=383 nm).

Waterproofness of the triazole-based azo metal complex dye represented by the above-described structural formula (25) was evaluated. The remaining percentage of the dye was 38 wt %, which had low waterproofness. On the other hand, the remaining percentage of the organic dye represented by the above-described structural formula (11) was 80 wt %, which had high waterproofness.

In the optical recording medium sample No. 5 thus prepared, data was recorded and reproduced similar to Example 1. The optimum laser power was 8.7 mW.

Next, by fixing the power of the laser beam to 0.35 mW, the data recorded on the optical recording medium sample No. 5 was reproduced and the reproduction signal was evaluated. The DC jitter was 8.1%.

Further, an entire surface of the optical recording medium sample No. 5 was irradiated with the laser beam having the power 10% higher than the optimum laser power, and the data was recorded over the entire surface of the optical recording medium sample No. 5. The high temperature and high humidity test conforming to ISO was conducted. After the high temperature and high humidity test, the entire surface of the optical recording medium sample No. 5 was observed with a microscope. A delamination diameter of 10 micrometers to 3 millimeters was observed between the protective layer and the recording layer at 26 points.

Example 6

An optical recording medium sample No. 6 was prepared similar to Example 1 except that the triazole-based azo metal complex dye represented by the above-described structural formula (26) was used in place of the triazole-based azo metal complex dye represented by the above-described structural formula (21).

The recording layer was formed such that the optical density (the OD value) was 0.25 at a maximum absorption wavelength ($\lambda$max=374 nm).

Waterproofness of the triazole-based azo metal complex dye represented by the above-described structural formula (26) was evaluated. The remaining percentage of the dye was 38 wt %, which had low waterproofness. On the other hand, the remaining percentage of the organic dye represented by the above-described structural formula (11) was 80 wt %, which had high waterproofness.

In the optical recording medium sample No. 6 thus prepared, data was recorded and reproduced similar to Example 1. The optimum laser power was 8.6 mW.

Next, by fixing the power of the laser beam to 0.35 mW, the data recorded on the optical recording medium sample No. 6 was reproduced and the reproduction signal was evaluated. The DC jitter was 8.5%.

Further, an entire surface of the optical recording medium sample No. 6 was irradiated with the laser beam having the power 10% higher than the optimum laser power, and the data was recorded over the entire surface of the optical recording medium sample No. 6. The high temperature and high humidity test conforming to ISO was conducted. After the high temperature and high humidity test, the entire surface of the optical recording medium sample No. 6 was observed with a microscope. A delamination diameter of 10 micrometers to 3 millimeters was observed between the protective layer and the recording layer at 18 points.

Example 7

An optical recording medium sample No. 7 was prepared similar to Example 1 except that the triazole-based azo metal complex dye represented by the above-described structural formula (27) was used in place of the triazole-based azo metal complex dye represented by the above-described structural formula (21).

The recording layer was formed such that the optical density (the OD value) was 0.25 at a maximum absorption wavelength ($\lambda$max=381 nm).

Waterproofness of the triazole-based azo metal complex dye represented by the above-described structural formula (27) was evaluated. The remaining percentage of the dye was 44 wt %, which had low waterproofness. On the other hand, the remaining percentage of the organic dye represented by the above-described structural formula (11) was 80 wt %, which had high waterproofness.

In the optical recording medium sample No. 7 thus prepared, data was recorded and reproduced similar to Example 1. The optimum laser power was 8.5 mW.

Next, by fixing the power of the laser beam to 0.35 mW, the data recorded on the optical recording medium sample No. 7 was reproduced and the reproduction signal was evaluated. The DC jitter was 8.8%.

Further, an entire surface of the optical recording medium sample No. 7 was irradiated with the laser beam having the power 10% higher than the optimum laser power, and the data was recorded over the entire surface of the optical recording medium sample No. 7. The high temperature and high humidity test conforming to ISO was conducted. After the high temperature and high humidity test, the entire surface of the optical recording medium sample No. 7 was observed with a microscope. A delamination diameter of 10 micrometers to 3 millimeters was observed between the protective layer and the recording layer at 39 points.

Example 8

An optical recording medium sample No. 8 was prepared similar to Example 1 except that the triazole-based azo metal complex dye represented by the above-described structural formula (28) was used in place of the triazole-based azo metal complex dye represented by the above-described structural formula (21).

The recording layer was formed such that the optical density (the OD value) was 0.25 at a maximum absorption wavelength (λmax=391 nm).

Waterproofness of the triazole-based azo metal complex dye represented by the above-described structural formula (28) was evaluated. The remaining percentage of the dye was 36 wt %, which had low waterproofness. On the other hand, the remaining percentage of the organic dye represented by the above-described structural formula (11) was 80 wt %, which had high waterproofness.

In the optical recording medium sample No. 8 thus prepared, data was recorded and reproduced similar to Example 1. The optimum laser power was 7.8 mW.

Next, by fixing the power of the laser beam to 0.35 mW, the data recorded on the optical recording medium sample No. 8 was reproduced and the reproduction signal was evaluated. The DC jitter was 8.9%.

Further, an entire surface of the optical recording medium sample No. 8 was irradiated with the laser beam having the power 10% higher than the optimum laser power, and the data was recorded over the entire surface of the optical recording medium sample No. 8. The high temperature and high humidity test conforming to ISO was conducted. After the high temperature and high humidity test, the entire surface of the optical recording medium sample No. 8 was observed with a microscope. A delamination diameter of 10 micrometers to 3 millimeters was observed between the protective layer and the recording layer at 41 points.

Example 9

An optical recording medium sample No. 9 was prepared similar to Example 1 except that the triazole-based azo metal complex dye represented by the above-described structural formula (29) was used in place of the triazole-based azo metal complex dye represented by the above-described structural formula (21).

The recording layer was formed such that the optical density (the OD value) was 0.25 at a maximum absorption wavelength (λmax=385 nm).

Waterproofness of the triazole-based azo metal complex dye represented by the above-described structural formula (29) was evaluated. The remaining percentage of the dye was 34 wt %, which had low waterproofness. On the other hand, the remaining percentage of the organic dye represented by the above-described structural formula (11) was 80 wt %, which had high waterproofness.

In the optical recording medium sample No. 9 thus prepared, data was recorded and reproduced similar to Example 1. The optimum laser power was 8.5 mW.

Next, by fixing the power of the laser beam to 0.35 mW, the data recorded on the optical recording medium sample No. 9 was reproduced and the reproduction signal was evaluated. The DC jitter was 8.5%.

Further, an entire surface of the optical recording medium sample No. 9 was irradiated with the laser beam having the power 10% higher than the optimum laser power, and the data was recorded over the entire surface of the optical recording medium sample No. 9.

The high temperature and high humidity test conforming to ISO was conducted. After the high temperature and high humidity test, the entire surface of the optical recording medium sample No. 9 was observed with a microscope. A delamination diameter of 10 micrometers to 3 millimeters was observed between the protective layer and the recording layer at 46 points.

Example 10

An optical recording medium sample No. 10 was prepared similar to Example 1 except that the organic dye represented by the above-described structural formula (12) was used in place of the organic dye represented by the above-described structural formula (11).

The recording layer was formed such that the optical density (the OD value) was 0.25 at a maximum absorption wavelength (λmax=370 nm).

Waterproofness of the organic dye represented by the above-described structural formula (12) was evaluated. The remaining percentage of the dye was 92 wt %.

In the optical recording medium sample No. 10 thus prepared, data was recorded and reproduced similar to Example 1. The optimum laser power was 8.6 mW.

Next, by fixing the power of the laser beam to 0.35 mW, the data recorded on the optical recording medium sample No. 10 was reproduced and the reproduction signal was evaluated. The DC jitter was 9.1%.

Further, an entire surface of the optical recording medium sample No. 10 was irradiated with the laser beam having the power 10% higher than the optimum laser power, and the data was recorded over the entire surface of the optical recording medium sample No. 10. The high temperature and high humidity test conforming to ISO was conducted. After the high temperature and high humidity test, the entire surface of the optical recording medium sample No. 10 was observed with a microscope. A delamination diameter of 10 micrometers to 3 millimeters was observed between the protective layer and the recording layer at 54 points.

Example 11

An optical recording medium sample No. 11 was prepared similar to Example 1 except that the organic dye represented by the above-described structural formula (13) was used in place of the organic dye represented by the above-described structural formula (11).

The recording layer was formed such that the optical density (the OD value) was 0.25 at a maximum absorption wavelength (λmax=370 nm).

Waterproofness of the organic dye represented by the above-described structural formula (13) was evaluated. The remaining percentage of the dye was 85 wt %.

In the optical recording medium sample No. 11 thus prepared, data was recorded and reproduced similar to Example 1. The optimum laser power was 8.6 mW.

Next, by fixing the power of the laser beam to 0.35 mW, the data recorded on the optical recording medium sample No. 11 was reproduced and the reproduction signal was evaluated. The DC jitter was 9.2%.

Further, an entire surface of the optical recording medium sample No. 11 was irradiated with the laser beam having the power 10% higher than the optimum laser power, and the data was recorded over the entire surface of the optical recording medium sample No. 11. The high temperature and high humidity test conforming to ISO was conducted. After the high temperature and high humidity test, the entire surface of the optical recording medium sample No. 11 was observed with a microscope. A delamination diameter of 10 micrometers to 3 millimeters was observed between the protective layer and the recording layer at 52 points.

Example 12

An optical recording medium sample No. 12 was prepared similar to Example 1 except that the organic dye represented by the above-described structural formula (14) was used in place of the organic dye represented by the above-described structural formula (11).

The recording layer was formed such that the optical density (the OD value) was 0.25 at a maximum absorption wavelength ($\lambda$max=370 nm).

Waterproofness of the organic dye represented by the above-described structural formula (14) was evaluated. The remaining percentage of the dye was 93 wt %.

In the optical recording medium sample No. 12 thus prepared, data was recorded and reproduced similar to Example 1

The optimum laser power was 8.6 mW.

Next, by fixing the power of the laser beam to 0.35 mW, the data recorded on the optical recording medium sample No. 12 was reproduced and the reproduction signal was evaluated. The DC jitter was 8.5%.

Further, an entire surface of the optical recording medium sample No. 12 was irradiated with the laser beam having the power 10% higher than the optimum laser power, and the data was recorded over the entire surface of the optical recording medium sample No. 12. The high temperature and high humidity test conforming to ISO was conducted. After the high temperature and high humidity test, the entire surface of the optical recording medium sample No. 12 was observed with a microscope. A delamination diameter of 10 micrometers to 3 millimeters was observed between the protective layer and the recording layer at 34 points.

Example 13

An optical recording medium sample No. 13 was prepared similar to Example 1 except that the organic dye represented by the above-described structural formula (15) was used in place of the organic dye represented by the above-described structural formula (11).

The recording layer was formed such that the optical density (the OD value) was 0.25 at a maximum absorption wavelength ($\lambda$max=370 nm).

Waterproofness of the organic dye represented by the above-described structural formula (15) was evaluated. The remaining percentage of the dye was 65 wt %.

In the optical recording medium sample No. 13 thus prepared, data was recorded and reproduced similar to Example 1. The optimum laser power was 8.2 mW.

Next, by fixing the power of the laser beam to 0.35 mW, the data recorded on the optical recording medium sample No. 13 was reproduced and the reproduction signal was evaluated. The DC jitter was 8.2%.

Further, an entire surface of the optical recording medium sample No. 13 was irradiated with the laser beam having the power 10% higher than the optimum laser power, and the data was recorded over the entire surface of the optical recording medium sample No. 13. The high temperature and high humidity test conforming to ISO was conducted. After the high temperature and high humidity test, the entire surface of the optical recording medium sample No. 13 was observed with a microscope. A delamination diameter of 10 micrometers to 3 millimeters was observed between the protective layer and the recording layer at 23 points.

Example 14

An optical recording medium sample No. 14 was prepared similar to Example 1 except that the organic dye represented by the above-described structural formula (16) was used in place of the organic dye represented by the above-described structural formula (11).

The recording layer was formed such that the optical density (the OD value) was 0.25 at a maximum absorption wavelength ($\lambda$max=370 nm).

Waterproofness of the organic dye represented by the above-described structural formula (16) was evaluated. The remaining percentage of the dye was 75 wt %.

In the optical recording medium sample No. 14 thus prepared, data was recorded and reproduced similar to Example 1. The optimum laser power was 8.8 mW.

Next, by fixing the power of the laser beam to 0.35 mW, the data recorded on the optical recording medium sample No. 14 was reproduced and the reproduction signal was evaluated. The DC jitter was 8.5%.

Further, an entire surface of the optical recording medium sample No. 14 was irradiated with the laser beam having the power 10% higher than the optimum laser power, and the data was recorded over the entire surface of the optical recording medium sample No. 14. The high temperature and high humidity test conforming to ISO was conducted. After the high temperature and high humidity test, the entire surface of the optical recording medium sample No. 14 was observed with a microscope. A delamination diameter of 10 micrometers to 3 millimeters was observed between the protective layer and the recording layer at 50 points.

Example 15

An optical recording medium sample No. 15 was prepared similar to Example 1 except that the organic dye represented by the above-described structural formula (17) was used in place of the organic dye represented by the above-described structural formula (11).

The recording layer was formed such that the optical density (the OD value) was 0.25 at a maximum absorption wavelength ($\lambda$max=370 nm).

Waterproofness of the organic dye represented by the above-described structural formula (17) was evaluated. The remaining percentage of the dye was 78 wt %.

In the optical recording medium sample No. 15 thus prepared, data was recorded and reproduced similar to Example 1. The optimum laser power was 8.5 mW.

Next, by fixing the power of the laser beam to 0.35 mW, the data recorded on the optical recording medium sample No. 15 was reproduced and the reproduction signal was evaluated. The DC jitter was 8.1%.

Further, an entire surface of the optical recording medium sample No. 15 was irradiated with the laser beam having the power 10% higher than the optimum laser power, and the data was recorded over the entire surface of the optical recording medium sample No. 15. The high temperature and high humidity test conforming to ISO was conducted. After the high temperature and high humidity test, the entire surface of the optical recording medium sample No. 15 was observed with a microscope. A delamination diameter of 10 micrometers to 3 millimeters was observed between the protective layer and the recording layer at 44 points.

Example 16

An optical recording medium sample No. 16 was prepared similar to Example 1 except that the organic dye represented by the above-described structural formula (18) was used in place of the organic dye represented by the above-described structural formula (11).

The recording layer was formed such that the optical density (the OD value) was 0.25 at a maximum absorption wavelength (λmax=370 nm).

Waterproofness of the organic dye represented by the above-described structural formula (18) was evaluated. The remaining percentage of the dye was 62 wt %.

In the optical recording medium sample No. 16 thus prepared, data was recorded and reproduced similar to Example 1. The optimum laser power was 8.3 mW.

Next, by fixing the power of the laser beam to 0.35 mW, the data recorded on the optical recording medium sample No. 16 was reproduced and the reproduction signal was evaluated. The DC jitter was 8.3%.

Further, an entire surface of the optical recording medium sample No. 16 was irradiated with the laser beam having the power 10% higher than the optimum laser power, and the data was recorded over the entire surface of the optical recording medium sample No. 16. The high temperature and high humidity test conforming to ISO was conducted. After the high temperature and high humidity test, the entire surface of the optical recording medium sample No. 16 was observed with a microscope. A delamination diameter of 10 micrometers to 3 millimeters was observed between the protective layer and the recording layer at 46 points.

Example 17

An optical recording medium sample No. 17 was prepared similar to Example 1 except that the organic dye represented by the above-described structural formula (19) was used in place of the organic dye represented by the above-described structural formula (11).

The recording layer was formed such that the optical density (the OD value) was 0.25 at a maximum absorption wavelength (λmax=370 nm).

Waterproofness of the organic dye represented by the above-described structural formula (19) was evaluated. The remaining percentage of the dye was 95 wt %.

In the optical recording medium sample No. 17 thus prepared, data was recorded and reproduced similar to Example 1. The optimum laser power was 8.6 mW.

Next, by fixing the power of the laser beam to 0.35 mW, the data recorded on the optical recording medium sample No. 17 was reproduced and the reproduction signal was evaluated. The DC jitter was 8.2%.

Further, an entire surface of the optical recording medium sample No. 17 was irradiated with the laser beam having the power 10% higher than the optimum laser power, and the data was recorded over the entire surface of the optical recording medium sample No. 17. The high temperature and high humidity test conforming to ISO was conducted. After the high temperature and high humidity test, the entire surface of the optical recording medium sample No. 17 was observed with a microscope. A delamination diameter of 10 micrometers to 3 millimeters was observed between the protective layer and the recording layer at 5 points.

Example 18

An optical recording medium sample No. 18 was prepared similar to Example 1 except that 3 wt % of the organic dye represented by the above-described structural formula (11) was added to 97 wt % of the triazole-based azo metal complex dye represented by the above-described structural formula (21).

The recording layer was formed such that the optical density (the OD value) was 0.25 at a maximum absorption wavelength (λmax=370 nm).

Waterproofness of the triazole-based azo metal complex dye represented by the above-described structural formula (21) was evaluated. The remaining percentage of the dye was 25 wt %, which had low waterproofness. On the other hand, waterproofness of the organic dye represented by the above-described structural formula (11) was evaluated. The remaining percentage of the dye was 80 wt %, which had high waterproofness.

In the optical recording medium sample No. 18 thus prepared, data was recorded and reproduced similar to Example 1. The optimum laser power was 8.6 mW.

Next, by fixing the power of the laser beam to 0.35 mW, the data recorded on the optical recording medium sample No. 18 was reproduced and the reproduction signal was evaluated. The DC jitter was 8.2%.

Further, an entire surface of the optical recording medium sample No. 18 was irradiated with the laser beam having the power 10% higher than the optimum laser power, and the data was recorded over the entire surface of the optical recording medium sample No. 18. The high temperature and high humidity test conforming to ISO was conducted. After the high temperature and high humidity test, the entire surface of the optical recording medium sample No. 18 was observed with a microscope. A delamination diameter of 10 micrometers to 3 millimeters was observed between the protective layer and the recording layer at 105 points.

Example 19

An optical recording medium sample No. 19 was prepared similar to Example 1 except that 5 wt % of the organic dye represented by the above-described structural formula (11) was added to 95 wt % of the triazole-based azo metal complex dye represented by the above-described structural formula (21).

The recording layer was formed such that the optical density (the OD value) was 0.25 at a maximum absorption wavelength (λmax=370 nm).

In the optical recording medium sample No. 19 thus prepared, data was recorded and reproduced similar to Example 1. The optimum laser power was 8.6 mW.

Next, by fixing the power of the laser beam to 0.35 mW, the data recorded on the optical recording medium sample No. 19 was reproduced and the reproduction signal was evaluated. The DC jitter was 8.4%.

Further, an entire surface of the optical recording medium sample No. 19 was irradiated with the laser beam having the power 10% higher than the optimum laser power, and the data was recorded over the entire surface of the optical recording medium sample No. 19. The high temperature and high humidity test conforming to ISO was conducted. After the high temperature and high humidity test, the entire surface of the optical recording medium sample No. 19 was observed with a microscope. A delamination diameter of 10 micrometers to 3 millimeters was observed between the protective layer and the recording layer at 90 points.

Example 20

An optical recording medium sample No. 20 was prepared similar to Example 1 except that 15 wt % of the organic dye represented by the above-described structural formula (11) was added to 85 wt % of the triazole-based azo metal complex dye represented by the above-described structural formula (21).

The recording layer was formed such that the optical density (the OD value) was 0.25 at a maximum absorption wavelength ($\lambda$max=370 nm).

In the optical recording medium sample No. 20 thus prepared, data was recorded and reproduced similar to Example 1. The optimum laser power was 8.6 mW.

Next, by fixing the power of the laser beam to 0.35 mW, the data recorded on the optical recording medium sample No. 20 was reproduced and the reproduction signal was evaluated. The DC jitter was 9.3%.

Further, an entire surface of the optical recording medium sample No. 20 was irradiated with the laser beam having the power 10% higher than the optimum laser power, and the data was recorded over the entire surface of the optical recording medium sample No. 20. The high temperature and high humidity test conforming to ISO was conducted. After the high temperature and high humidity test, the entire surface of the optical recording medium sample No. 20 was observed with a microscope. A delamination diameter of 10 micrometers to 3 millimeters was observed between the protective layer and the recording layer at 30 points.

Example 21

An optical recording medium sample No. 21 was prepared similar to Example 1 except that 25 wt % of the organic dye represented by the above-described structural formula (11) was added to 75 wt % of the triazole-based azo metal complex dye represented by the above-described structural formula (21).

The recording layer was formed such that the optical density (the OD value) was 0.25 at a maximum absorption wavelength ($\lambda$max=370 nm).

In the optical recording medium sample No. 21 thus prepared, data was recorded and reproduced similar to Example 1. The optimum laser power was 8.6 mW.

Next, by fixing the power of the laser beam to 0.35 mW, the data recorded on the optical recording medium sample No. 21 was reproduced and the reproduction signal was evaluated. The DC jitter was 12.2%.

Further, an entire surface of the optical recording medium sample No. 21 was irradiated with the laser beam having the power 10% higher than the optimum laser power, and the data was recorded over the entire surface of the optical recording medium sample No. 21. The high temperature and high humidity test conforming to ISO was conducted. After the high temperature and high humidity test, the entire surface of the optical recording medium sample No. 21 was observed with a microscope. A delamination diameter of 10 micrometers to 3 millimeters was observed between the protective layer and the recording layer at 14 points.

Example 22

An optical recording medium sample No. 22 was prepared similar to Example 1 except that 10 wt % of the organic dye represented by the above-described structural formula (11) was added to 90 wt % of the triazole-based azo metal complex dye represented by the above-described structural formula (23).

The recording layer was formed such that the optical density (the OD value) was 0.25 at a maximum absorption wavelength ($\lambda$max=379 nm).

Waterproofness of the triazole-based azo metal complex dye represented by the above-described structural formula (23) was evaluated. The remaining percentage of the dye was 34 wt %, which had low waterproofness. On the other hand, waterproofness of the organic dye represented by the above-described structural formula (11) was evaluated. The remaining percentage of the dye was 80 wt %, which had high waterproofness.

In the optical recording medium sample No. 22 thus prepared, data was recorded and reproduced similar to Example 1. The optimum laser power was 8.8 mW.

Next, by fixing the power of the laser beam to 0.35 mW, the data recorded on the optical recording medium sample No. 22 was reproduced and the reproduction signal was evaluated. The DC jitter was 8.4%.

Further, an entire surface of the optical recording medium sample No. 22 was irradiated with the laser beam having the power 10% higher than the optimum laser power, and the data was recorded over the entire surface of the optical recording medium sample No. 22. The high temperature and high humidity test conforming to ISO was conducted. After the high temperature and high humidity test, the entire surface of the optical recording medium sample No. 22 was observed with a microscope. A delamination diameter of 10 micrometers to 3 millimeters was observed between the protective layer and the recording layer at 45 points.

Example 23

An optical recording medium sample No. 23 was prepared similar to Example 1 except that 10 wt % of the organic dye represented by the above-described structural formula (12) was added to 90 wt % of the triazole-based azo metal complex dye represented by the above-described structural formula (23).

The recording layer was formed such that the optical density (the OD value) was 0.25 at a maximum absorption wavelength ($\lambda$max=379 nm).

Waterproofness of the triazole-based azo metal complex dye represented by the above-described structural formula (23) was evaluated. The remaining percentage of the dye was 25 wt %, which had low waterproofness. On the other hand, waterproofness of the organic dye represented by the above-described structural formula (11) was evaluated. The remaining percentage of the dye was 92 wt %, which had high waterproofness.

In the optical recording medium sample No. 23 thus prepared, data was recorded and reproduced similar to Example 1. The optimum laser power was 8.9 mW.

Next, by fixing the power of the laser beam to 0.35 mW, the data recorded on the optical recording medium sample No. 23 was reproduced and the reproduction signal was evaluated. The DC jitter was 8.6%.

Further, an entire surface of the optical recording medium sample No. 23 was irradiated with the laser beam having the power 10% higher than the optimum laser power, and the data was recorded over the entire surface of the optical recording medium sample No. 23. The high temperature and high humidity test conforming to ISO was conducted. After the high temperature and high humidity test, the entire surface of the optical recording medium sample No. 23 was observed with a microscope. A delamination diameter of 10 micrometers to 3 millimeters was observed between the protective layer and the recording layer at 80 points.

Example 24

An optical recording medium sample No. 24 was prepared similar to Example 1 except that 10 wt % of the organic dye represented by the above-described structural formula (13) was added to 90 wt % of the triazole-based azo metal complex dye represented by the above-described structural formula (24).

The recording layer was formed such that the optical density (the OD value) was 0.25 at a maximum absorption wavelength (λmax=379 nm).

Waterproofness of the triazole-based azo metal complex dye represented by the above-described structural formula (24) was evaluated. The remaining percentage of the dye was 36 wt %, which had low waterproofness. On the other hand, waterproofness of the organic dye represented by the above-described structural formula (11) was evaluated. The remaining percentage of the dye represented by the above-described structural formula (11) was 85 wt %, which had high waterproofness.

In the optical recording medium sample No. 24 thus prepared, data was recorded and reproduced similar to Example 1. The optimum laser power was 8.5 mW.

Next, by fixing the power of the laser beam to 0.35 mW, the data recorded on the optical recording medium sample No. 24 was reproduced and the reproduction signal was evaluated. The DC jitter was 8.9%.

Further, an entire surface of the optical recording medium sample No. 24 was irradiated with the laser beam having the power 10% higher than the optimum laser power, and the data was recorded over the entire surface of the optical recording medium sample No. 24.

The high temperature and high humidity test conforming to ISO was conducted. After the high temperature and high humidity test, the entire surface of the optical recording medium sample No. 24 was observed with a microscope. A delamination diameter of 10 micrometers to 3 millimeters was observed between the protective layer and the recording layer at 75 points.

Example 25

An optical recording medium sample No. 25 was prepared similar to Example 1 except that 10 wt % of the organic dye represented by the above-described structural formula (14) was added to 90 wt % of the triazole-based azo metal complex dye represented by the above-described structural formula (24).

The recording layer was formed such that the optical density (the OD value) was 0.25 at a maximum absorption wavelength (λmax=379 nm).

Waterproofness of the triazole-based azo metal complex dye represented by the above-described structural formula (24) was evaluated. The remaining percentage of the dye was 36 wt %, which had low waterproofness. On the other hand, waterproofness of the organic dye represented by the above-described structural formula (11) was evaluated. The remaining percentage of the dye was 93 wt %, which had high waterproofness.

In the optical recording medium sample No. 25 thus prepared, data was recorded and reproduced similar to Example 1. The optimum laser power was 8.7 mW.

Next, by fixing the power of the laser beam to 0.35 mW, the data recorded on the optical recording medium sample No. 25 was reproduced and the reproduction signal was evaluated. The DC jitter was 8.7%.

Further, an entire surface of the optical recording medium sample No. 25 was irradiated with the laser beam having the power 10% higher than the optimum laser power, and the data was recorded over the entire surface of the optical recording medium sample No. 25. The high temperature and high humidity test conforming to ISO was conducted. After the high temperature and high humidity test, the entire surface of the optical recording medium sample No. 25 was observed with a microscope. A delamination diameter of 10 micrometers to 3 millimeters was observed between the protective layer and the recording layer at 80 points.

Example 26

An optical recording medium sample No. 26 was prepared similar to Example 1 except that 10 wt % of the organic dye represented by the above-described structural formula (12) was added to 90 wt % of the triazole-based azo metal complex dye represented by the above-described structural formula (25).

The recording layer was formed such that the optical density (the OD value) was 0.25 at a maximum absorption wavelength (λmax=383 nm).

Waterproofness of the triazole-based azo metal complex dye represented by the above-described structural formula (25) was evaluated. The remaining percentage of the dye was 38 wt %, which had low waterproofness. On the other hand, waterproofness of the organic dye represented by the above-described structural formula (11) was evaluated. The remaining percentage of the dye was 92 wt %, which had high waterproofness.

In the optical recording medium sample No. 26 thus prepared, data was recorded and reproduced similar to Example 1. The optimum laser power was 8.6 mW.

Next, by fixing the power of the laser beam to 0.35 mW, the data recorded on the optical recording medium sample No. 26 was reproduced and the reproduction signal was evaluated. The DC jitter was 8.1%.

Further, an entire surface of the optical recording medium sample No. 26 was irradiated with the laser beam having the power 10% higher than the optimum laser power, and the data was recorded over the entire surface of the optical recording medium sample No. 26. The high temperature and high humidity test conforming to ISO was conducted. After the high temperature and high humidity test, the entire surface of the optical recording medium sample No. 26 was observed with a microscope. A delamination diameter of 10 micrometers to 3 millimeters was observed between the protective layer and the recording layer at 49 points.

Example 27

An optical recording medium sample No. 27 was prepared similar to Example 1 except that 5 wt % of the organic dye represented by the above-described structural formula (14) was added to 95 wt % of the triazole-based azo metal complex dye represented by the above-described structural formula (25).

The recording layer was formed such that the optical density (the OD value) was 0.25 at a maximum absorption wavelength (λmax=383 nm).

Waterproofness of the triazole-based azo metal complex dye represented by the above-described structural formula (25) was evaluated. The remaining percentage of the dye was 38 wt %, which had low waterproofness. On the other hand, waterproofness of the organic dye represented by the above-described structural formula (14) was evaluated. The remaining percentage of the dye was 93 wt %, which had high waterproofness.

In the optical recording medium sample No. 27 thus prepared, data was recorded and reproduced similar to Example 1. The optimum laser power was 8.8 mW.

Next, by fixing the power of the laser beam to 0.35 mW, the data recorded on the optical recording medium sample No. 27 was reproduced and the reproduction signal was evaluated. The DC jitter was 8.6%

Further, an entire surface of the optical recording medium sample No. 27 was irradiated with the laser beam having the power 10% higher than the optimum laser power, and the data was recorded over the entire surface of the optical recording medium sample No. 27. The high temperature and high humidity test conforming to ISO was conducted. After the high temperature and high humidity test, the entire surface of the optical recording medium sample No. 27 was observed with a microscope. A delamination diameter of 10 micrometers to 3 millimeters was observed between the protective layer and the recording layer at 43 points.

Example 28

An optical recording medium sample No. 28 was prepared similar to Example 1 except that 18 wt % of the organic dye represented by the above-described structural formula (14) was added to 82 wt % of the triazole-based azo metal complex dye represented by the above-described structural formula (25).

The recording layer was formed such that the optical density (the OD value) was 0.25 at a maximum absorption wavelength ($\lambda$max=383 nm).

In the optical recording medium sample No. 28 thus prepared, data was recorded and reproduced similar to Example 1. The optimum laser power was 8.5 mW.

Next, by fixing the power of the laser beam to 0.35 mW, the data recorded on the optical recording medium sample No. 28 was reproduced and the reproduction signal was evaluated. The DC jitter was 9.3%.

Further, an entire surface of the optical recording medium sample No. 28 was irradiated with the laser beam having the power 10% higher than the optimum laser power, and the data was recorded over the entire surface of the optical recording medium sample No. 28. The high temperature and high humidity test conforming to ISO was conducted. After the high temperature and high humidity test, the entire surface of the optical recording medium sample No. 28 was observed with a microscope. A delamination diameter of 10 micrometers to 3 millimeters was observed between the protective layer and the recording layer at 18 points.

Example 29

An optical recording medium sample No. 29 was prepared similar to Example 1 except that 20 wt % of the organic dye represented by the above-described structural formula (14) was added to 80 wt % of the triazole-based azo metal complex dye represented by the above-described structural formula (25).

The recording layer was formed such that the optical density (the OD value) was 0.25 at a maximum absorption wavelength ($\lambda$max=383 nm).

In the optical recording medium sample No. 29 thus prepared, data was recorded and reproduced similar to Example 1. The optimum laser power was 8.7 mW.

Next, by fixing the power of the laser beam to 0.35 mW, the data recorded on the optical recording medium sample No. 29 was reproduced and the reproduction signal was evaluated. The DC jitter was 9.8%.

Further, an entire surface of the optical recording medium sample No. 29 was irradiated with the laser beam having the power 10% higher than the optimum laser power, and the data was recorded over the entire surface of the optical recording medium sample No. 29. The high temperature and high humidity test conforming to ISO was conducted. After the high temperature and high humidity test, the entire surface of the optical recording medium sample No. 29 was observed with a microscope. A delamination diameter of 10 micrometers to 3 millimeters was observed between the protective layer and the recording layer at 10 points.

Example 30

An optical recording medium sample No. 30 was prepared similar to Example 1 except that 3 wt % of the organic dye represented by the above-described structural formula (15) was added to 97 wt % of the triazole-based azo metal complex dye represented by the above-described structural formula (25).

The recording layer was formed such that the optical density (the OD value) was 0.25 at a maximum absorption wavelength ($\lambda$max=383 nm).

Waterproofness of the triazole-based azo metal complex dye represented by the above-described structural formula (25) was evaluated. The remaining percentage of the dye was 38 wt %, which had low waterproofness. On the other hand, waterproofness of the organic dye represented by the above-described structural formula (15) was evaluated. The remaining percentage of the dye was 65 wt %, which had high waterproofness.

In the optical recording medium sample No. 30 thus prepared, data was recorded and reproduced similar to Example 1. The optimum laser power was 8.4 mW.

Next, by fixing the power of the laser beam to 0.35 mW, the data recorded on the optical recording medium sample No. 30 was reproduced and the reproduction signal was evaluated. The DC jitter was 8.4%.

Further, an entire surface of the optical recording medium sample No. 30 was irradiated with the laser beam having the power 10% higher than the optimum laser power, and the data was recorded over the entire surface of the optical recording medium sample No. 30. The high temperature and high humidity test conforming to ISO was conducted. After the high temperature and high humidity test, the entire surface of the optical recording medium sample No. 30 was observed with a microscope. A delamination diameter of 10 micrometers to 3 millimeters was observed between the protective layer and the recording layer at 26 points.

Example 31

An optical recording medium sample No. 31 was prepared similar to Example 1 except that 10 wt % of the organic dye represented by the above-described structural formula (18) was added to 90 wt % of the triazole-based azo metal complex dye represented by the above-described structural formula (25).

The recording layer was formed such that the optical density (the OD value) was 0.25 at a maximum absorption wavelength ($\lambda$max=383 nm).

Waterproofness of the triazole-based azo metal complex dye represented by the above-described structural formula (25) was evaluated. The remaining percentage of the dye was 38 wt %, which had low waterproofness. On the other hand, waterproofness of the organic dye represented by the above-described structural formula (18) was evaluated. The remaining percentage of the dye was 62 wt %, which had high waterproofness.

In the optical recording medium sample No. 31 thus prepared, data was recorded and reproduced similar to Example 1. The optimum laser power was 8.6 mW.

Next, by fixing the power of the laser beam to 0.35 mW, the data recorded on the optical recording medium sample No. 31 was reproduced and the reproduction signal was evaluated. The DC jitter was 8.9%.

Further, an entire surface of the optical recording medium sample No. 31 was irradiated with the laser beam having the power 10% higher than the optimum laser power, and the data was recorded over the entire surface of the optical recording medium sample No. 31. The high temperature and high humidity test conforming to ISO was conducted. After the high temperature and high humidity test, the entire surface of the optical recording medium sample No. 31 was observed with a microscope. A delamination diameter of 10 micrometers to 3 millimeters was observed between the protective layer and the recording layer at 56 points.

Example 32

An optical recording medium sample No. 32 was prepared similar to Example 1 except that 10 wt % of the organic dye represented by the above-described structural formula (12) was added to 90 wt % of the triazole-based azo metal complex dye represented by the above-described structural formula (26).

The recording layer was formed such that the optical density (the OD value) was 0.25 at a maximum absorption wavelength ($\lambda$max=374 nm).

Waterproofness of the triazole-based azo metal complex dye represented by the above-described structural formula (26) was evaluated. The remaining percentage of the dye was 38 wt %, which had low waterproofness. On the other hand, waterproofness of the organic dye represented by the above-described structural formula (12) was evaluated. The remaining percentage of the dye was 92 wt %, which had high waterproofness.

In the optical recording medium sample No. 32 thus prepared, data was recorded and reproduced similar to Example 1. The optimum laser power was 8.6 mW.

Next, by fixing the power of the laser beam to 0.35 mW, the data recorded on the optical recording medium sample No. 32 was reproduced and the reproduction signal was evaluated. The DC jitter was 8.4%.

Further, an entire surface of the optical recording medium sample No. 32 was irradiated with the laser beam having the power 10% higher than the optimum laser power, and the data was recorded over the entire surface of the optical recording medium sample No. 32. The high temperature and high humidity test conforming to ISO was conducted. After the high temperature and high humidity test, the entire surface of the optical recording medium sample No. 32 was observed with a microscope. A delamination diameter of 10 micrometers to 3 millimeters was observed between the protective layer and the recording layer at 45 points.

Example 33

An optical recording medium sample No. 33 was prepared similar to Example 1 except that 10 wt % of the organic dye represented by the above-described structural formula (14) was added to 90 wt % of the triazole-based azo metal complex dye represented by the above-described structural formula (26).

The recording layer was formed such that the optical density (the OD value) was 0.25 at a maximum absorption wavelength ($\lambda$max=374 nm).

Waterproofness of the triazole-based azo metal complex dye represented by the above-described structural formula (26) was evaluated. The remaining percentage of the dye was 38 wt %, which had low waterproofness. On the other hand, waterproofness of the organic dye represented by the above-described structural formula (14) was evaluated. The remaining percentage of the dye was 93 wt %, which had high waterproofness.

In the optical recording medium sample No. 33 thus prepared, data was recorded and reproduced similar to Example 1. The optimum laser power was 8.7 mW.

Next, by fixing the power of the laser beam to 0.35 mW, the data recorded on the optical recording medium sample No. 33 was reproduced and the reproduction signal was evaluated. The DC jitter was 8.7%.

Further, an entire surface of the optical recording medium sample No. 33 was irradiated with the laser beam having the power 10% higher than the optimum laser power, and the data was recorded over the entire surface of the optical recording medium sample No. 33. The high temperature and high humidity test conforming to ISO was conducted. After the high temperature and high humidity test, the entire surface of the optical recording medium sample No. 33 was observed with a microscope. A delamination diameter of 10 micrometers to 3 millimeters was observed between the protective layer and the recording layer at 67 points.

Example 34

An optical recording medium sample No. 34 was prepared similar to Example 1 except that 10 wt % of the organic dye represented by the above-described structural formula (12) was added to 90 wt % of the triazole-based azo metal complex dye represented by the above-described structural formula (27).

The recording layer was formed such that the optical density (the OD value) was 0.25 at a maximum absorption wavelength ($\lambda$max=381 nm).

Waterproofness of the triazole-based azo metal complex dye represented by the above-described structural formula (27) was evaluated. The remaining percentage of the dye was 44 wt %, which had low waterproofness. On the other hand, waterproofness of the organic dye represented by the above-described structural formula (12) was evaluated. The remaining percentage of the dye was 92 wt %, which had high waterproofness.

In the optical recording medium sample No. 34 thus prepared, data was recorded and reproduced similar to Example 1. The optimum laser power was 8.2 mW.

Next, by fixing the power of the laser beam to 0.35 mW, the data recorded on the optical recording medium sample No. 34 was reproduced and the reproduction signal was evaluated. The DC jitter was 8.3%.

Further, an entire surface of the optical recording medium sample No. 34 was irradiated with the laser beam having the power 10% higher than the optimum laser power, and the data was recorded over the entire surface of the optical recording medium sample No. 34. The high temperature and high humidity test conforming to ISO was conducted. After the high temperature and high humidity test, the entire surface of the optical recording medium sample No. 34 was observed with a microscope. A delamination diameter of 10 micrometers to 3 millimeters was observed between the protective layer and the recording layer at 78 points.

Comparative Example 1

An optical recording medium comparative sample No. 1 was prepared similar to Example 1 except that no organic dye represented by the above-described structural formula (11) was added, and the triazole-based azo metal complex dye represented by the above-described structural formula (21) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=370 nm).

Waterproofness of the triazole-based azo metal complex dye represented by the above-described structural formula (21) was evaluated. The remaining percentage of the dye was 25 wt %, which had low waterproofness.

In the optical recording medium comparative sample No. 1 thus prepared, data was recorded and reproduced similar to Example 1. The optimum laser power was 8.6 mW.

Next, by fixing the power of the laser beam to 0.35 mW, the data recorded on the optical recording medium comparative sample No. 1 was reproduced and the reproduction signal was evaluated. The DC jitter was 8.2%.

Further, an entire surface of the optical recording medium comparative sample No. 1 was irradiated with the laser beam having the power 10% higher than the optimum laser power, and the data was recorded over the entire surface of the optical recording medium comparative sample No. 1. The high temperature and high humidity test conforming to ISO was conducted. After the high temperature and high humidity test, the entire surface of the optical recording medium comparative sample No. 1 was observed with a microscope. A delamination diameter of 10 micrometers to 3 millimeters was observed between the protective layer and the recording layer at 246 points.

Comparative Example 2

An optical recording medium comparative sample No. 2 was prepared similar to Example 2 except that no organic dye represented by the above-described structural formula (11) was added, and the triazole-based azo metal complex dye represented by the above-described structural formula (22) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=373 nm).

Waterproofness of the triazole-based azo metal complex dye represented by the above-described structural formula (22) was evaluated. The remaining percentage of the dye was 28 wt %, which had low waterproofness.

In the optical recording medium comparative sample No. 2 thus prepared, data was recorded and reproduced similar to Example 1. The optimum laser power was 9.0 mW.

Next, by fixing the power of the laser beam to 0.35 mW, the data recorded on the optical recording medium comparative sample No. 2 was reproduced and the reproduction signal was evaluated. The DC jitter was 8.4%.

Further, an entire surface of the optical recording medium comparative sample No. 2 was irradiated with the laser beam having the power 10% higher than the optimum laser power, and the data was recorded over the entire surface of the optical recording medium comparative sample No. 2. The high temperature and high humidity test conforming to ISO was conducted. After the high temperature and high humidity test, the entire surface of the optical recording medium comparative sample No. 2 was observed with a microscope. A delamination diameter of 10 micrometers to 3 millimeters was observed between the protective layer and the recording layer at 227 points.

Comparative Example 3

An optical recording medium comparative sample No. 3 was prepared similar to Example 3 except that no organic dye represented by the above-described structural formula (11) was added, and the triazole-based azo metal complex dye represented by the above-described structural formula (23) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=379 nm).

Waterproofness of the triazole-based azo metal complex dye represented by the above-described structural formula (23) was evaluated. The remaining percentage of the dye was 34 wt %, which had low waterproofness.

In the optical recording medium comparative sample No. 3 thus prepared, data was recorded and reproduced similar to Example 1. The optimum laser power was 8.8 mW.

Next, by fixing the power of the laser beam to 0.35 mW, the data recorded on the optical recording medium comparative sample No. 3 was reproduced and the reproduction signal was evaluated. The DC jitter was 8.6%.

Further, an entire surface of the optical recording medium comparative sample No. 3 was irradiated with the laser beam having the power 10% higher than the optimum laser power, and the data was recorded over the entire surface of the optical recording medium comparative sample No. 3. The high temperature and high humidity test conforming to ISO was conducted. After the high temperature and high humidity test, the entire surface of the optical recording medium comparative sample No. 3 was observed with a microscope. A delamination diameter of 10 micrometers to 3 millimeters was observed between the protective layer and the recording layer at 186 points.

Comparative Example 4

An optical recording medium comparative sample No. 4 was prepared similar to Example 4 except that no organic dye represented by the above-described structural formula (11) was added, and the triazole-based azo metal complex dye represented by the above-described structural formula (24) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=379 nm).

Waterproofness of the triazole-based azo metal complex dye represented by the above-described structural formula (24) was evaluated. The remaining percentage of the dye was 36 wt %, which had low waterproofness.

In the optical recording medium comparative sample No. 4 thus prepared, data was recorded and reproduced similar to Example 1. The optimum laser power was 8.6 mW.

Next, by fixing the power of the laser beam to 0.35 mW, the data recorded on the optical recording medium comparative sample No. 4 was reproduced and the reproduction signal was evaluated. The DC jitter was 8.1%.

Further, an entire surface of the optical recording medium comparative sample No. 4 was irradiated with the laser beam having the power 10% higher than the optimum laser power, and the data was recorded over the entire surface of the optical recording medium comparative sample No. 4. The high temperature and high humidity test conforming to ISO was conducted. After the high temperature and high humidity test, the entire surface of the optical recording medium comparative sample No. 4 was observed with a microscope. A delamination diameter of 10 micrometers to 3 millimeters was observed between the protective layer and the recording layer at 198 points.

Comparative Example 5

An optical recording medium comparative sample No. 5 was prepared similar to Example 5 except that no organic dye represented by the above-described structural formula (11) was added, and the triazole-based azo metal complex dye represented by the above-described structural formula (25) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=383 nm).

Waterproofness of the triazole-based azo metal complex dye represented by the above-described structural formula (25) was evaluated. The remaining percentage of the dye was 38 wt %, which had low waterproofness.

In the optical recording medium comparative sample No. 5 thus prepared, data was recorded and reproduced similar to Example 1. The optimum laser power was 8.7 mW.

Next, by fixing the power of the laser beam to 0.35 mW, the data recorded on the optical recording medium comparative sample No. 5 was reproduced and the reproduction signal was evaluated. The DC jitter was 8.0%.

Further, an entire surface of the optical recording medium comparative sample No. 5 was irradiated with the laser beam having the power 10% higher than the optimum laser power, and the data was recorded over the entire surface of the optical recording medium comparative sample No. 5. The high temperature and high humidity test conforming to ISO was conducted. After the high temperature and high humidity test, the entire surface of the optical recording medium comparative sample No. 5 was observed with a microscope. A delamination diameter of 10 micrometers to 3 millimeters was observed between the protective layer and the recording layer at 163 points.

Comparative Example 6

An optical recording medium comparative sample No. 6 was prepared similar to Example 6 except that no organic dye represented by the above-described structural formula (11) was added, and the triazole-based azo metal complex dye represented by the above-described structural formula (26) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=374 nm).

Waterproofness of the triazole-based azo metal complex dye represented by the above-described structural formula (26) was evaluated. The remaining percentage of the dye was 38 wt %, which had low waterproofness.

In the optical recording medium comparative sample No. 6 thus prepared, data was recorded and reproduced similar to Example 1. The optimum laser power was 8.6 mW.

Next, by fixing the power of the laser beam to 0.35 mW, the data recorded on the optical recording medium comparative sample No. 6 was reproduced and the reproduction signal was evaluated. The DC jitter was 8.3%.

Further, an entire surface of the optical recording medium comparative sample No. 6 was irradiated with the laser beam having the power 10% higher than the optimum laser power, and the data was recorded over the entire surface of the optical recording medium comparative sample No. 6. The high temperature and high humidity test conforming to ISO was conducted. After the high temperature and high humidity test, the entire surface of the optical recording medium comparative sample No. 6 was observed with a microscope. A delamination diameter of 10 micrometers to 3 millimeters was observed between the protective layer and the recording layer at 124 points.

Comparative Example 7

An optical recording medium comparative sample No. 7 was prepared similar to Example 7 except that no organic dye represented by the above-described structural formula (11) was added, and the triazole-based azo metal complex dye represented by the above-described structural formula (27) was dissolved into 2,2,3,3-tetrafluoro-1-propanol (TFP) to prepare an organic dye solution.

The recording layer was formed such that the optical density (the OD value) was 0.25 at a maximum absorption wavelength ($\lambda$max=381 nm).

Waterproofness of the organic dye represented by the above-described structural formula (27) was evaluated. The remaining percentage of the dye was 44 wt %, which had low waterproofness.

In the optical recording medium comparative sample No. 7 thus prepared, data was recorded and reproduced similar to Example 1. The optimum laser power was 8.5 mW.

Next, by fixing the power of the laser beam to 0.35 mW, the data recorded on the optical recording medium comparative sample No. 7 was reproduced and the reproduction signal was evaluated. The DC jitter was 8.5%.

Further, an entire surface of the optical recording medium comparative sample No. 7 was irradiated with the laser beam having the power 10% higher than the optimum laser power, and the data was recorded over the entire surface of the optical recording medium comparative sample No. 7. The high temperature and high humidity test conforming to ISO was conducted. After the high temperature and high humidity test, the entire surface of the optical recording medium comparative sample No. 7 was observed with a microscope. A delamination diameter of 10 micrometers to 3 millimeters was observed between the protective layer and the recording layer at 116 points.

Comparative Example 8

An optical recording medium comparative sample No. 8 was prepared similar to Example 8 except that no organic dye represented by the above-described structural formula (11) was added, and the triazole-based azo metal complex dye represented by the above-described structural formula (28) was dissolved into 2,2,3,3-tetrafluoro-1-propanol (TFP) to prepare an organic dye solution.

The recording layer was formed such that the optical density (the OD value) was 0.25 at a maximum absorption wavelength (λmax=391 nm).

Waterproofness of the organic dye represented by the above-described structural formula (28) was evaluated. The remaining percentage of the dye was 36 wt %, which had low waterproofness.

In the optical recording medium comparative sample No. 8 thus prepared, data was recorded and reproduced similar to Example 1. The optimum laser power was 7.8 mW.

Next, by fixing the power of the laser beam to 0.35 mW, the data recorded on the optical recording medium comparative sample No. 8 was reproduced and the reproduction signal was evaluated. The DC jitter was 8.0%.

Further, an entire surface of the optical recording medium comparative sample No. 8 was irradiated with the laser beam having the power 10% higher than the optimum laser power, and the data was recorded over the entire surface of the optical recording medium comparative sample No. 8. The high temperature and high humidity test conforming to ISO was conducted. After the high temperature and high humidity test, the entire surface of the optical recording medium comparative sample No. 8 was observed with a microscope. A delamination diameter of 10 micrometers to 3 millimeters was observed between the protective layer and the recording layer at 189 points.

Comparative Example 9

An optical recording medium comparative sample No. 9 was prepared similar to Example 9 except that no organic dye represented by the above-described structural formula (11) was added, and the triazole-based azo metal complex dye represented by the above-described structural formula (29) was dissolved into 2,2,3,3-tetrafluoro-1-propanol (TFP) to prepare an organic dye solution.

The recording layer was formed such that the optical density (the OD value) was 0.25 at a maximum absorption wavelength (λmax=385 nm).

Waterproofness of the triazole-based azo metal complex dye represented by the above-described structural formula (29) was evaluated. The remaining percentage of the dye was 34 wt %, which had low waterproofness.

In the optical recording medium comparative sample No. 9 thus prepared, data was recorded and reproduced similar to Example 1. The optimum laser power was 8.5 mW.

Next, by fixing the power of the laser beam to 0.35 mW, the data recorded on the optical recording medium comparative sample No. 9 was reproduced and the reproduction signal was evaluated. The DC jitter was 8.6%.

Further, an entire surface of the optical recording medium comparative sample No. 9 was irradiated with the laser beam having the power 10% higher than the optimum laser power, and the data was recorded over the entire surface of the optical recording medium comparative sample No. 9. The high temperature and high humidity test conforming to ISO was conducted. After the high temperature and high humidity test, the entire surface of the optical recording medium comparative sample No. 9 was observed with a microscope. A delamination diameter of 10 micrometers to 3 millimeters was observed between the protective layer and the recording layer at 208 points.

Comparative Example 10

An optical recording medium comparative sample No. 10 was prepared similar to Example 1 except that 10 wt % of the organic dye represented by the following structural formula (40) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 31]

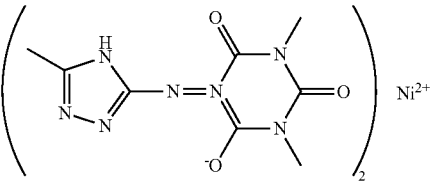

Structural formula (40)

The recording layer was formed such that the optical density (the OD value) was 0.25 at a maximum absorption wavelength (λmax=370 nm).

Waterproofness of the triazole-based azo metal complex dye represented by the above-described structural formula (21) was evaluated. The remaining percentage of the dye was 25 wt %, which had low waterproofness. On the other hand, waterproofness of the organic dye represented by the above-described structural formula (14) was evaluated. The remaining percentage of the dye was 9 wt %, which had significantly low waterproofness.

In the optical recording medium comparative sample No. 10 thus prepared, data was recorded and reproduced similar to Example 1. The optimum laser power was 8.6 mW.

Next, by fixing the power of the laser beam to 0.35 mW, the data recorded on the optical recording medium comparative sample No. 10 was reproduced and the reproduction signal was evaluated. The DC jitter was 8.5%.

Further, an entire surface of the optical recording medium comparative sample No. 10 was irradiated with the laser beam having the power 10% higher than the optimum laser power, and the data was recorded over the entire surface of the optical recording medium comparative sample No. 10. The high temperature and high humidity test conforming to ISO was conducted. After the high temperature and high humidity test, the entire surface of the optical recording medium comparative sample No. 10 was observed with a microscope. A delamination diameter of 10 micrometers to 3 millimeters was observed between the protective layer and the recording layer at 368 points.

Comparative Example 11

An optical recording medium comparative sample No. 11 was prepared similar to Example 1 except that 10 wt % of the organic dye represented by the following structural formula (41) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 32]

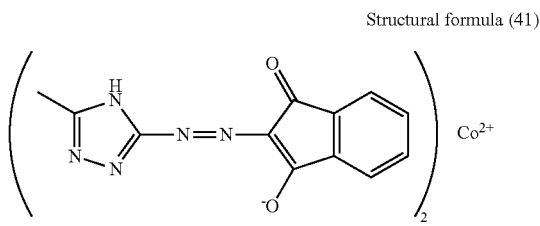

Structural formula (41)

The recording layer was formed such that the optical density (the OD value) was 0.25 at a maximum absorption wavelength (λmax=370 nm).

Waterproofness of the organic dye represented by the above-described structural formula (41) was evaluated. The remaining percentage of the dye was 18 wt %, which had low waterproofness.

In the optical recording medium comparative sample No. 11 thus prepared, data was recorded and reproduced similar to Example 1. The optimum laser power was 8.6 mW.

Next, by fixing the power of the laser beam to 0.35 mW, the data recorded on the optical recording medium comparative sample No. 11 was reproduced and the reproduction signal was evaluated. The DC jitter was 8.8%.

Further, an entire surface of the optical recording medium comparative sample No. 11 was irradiated with the laser beam having the power 10% higher than the optimum laser power, and the data was recorded over the entire surface of the optical recording medium comparative sample No. 11. The high temperature and high humidity test conforming to ISO was conducted. After the high temperature and high humidity test, the entire surface of the optical recording medium comparative sample No. 11 was observed with a microscope. A delamination diameter of 10 micrometers to 3 millimeters was observed between the protective layer and the recording layer at 465 points.

Comparative Example 12

An optical recording medium comparative sample No. 12 was prepared similar to Example 1 except that 10 wt % of the organic dye represented by the following structural formula (42) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 33]

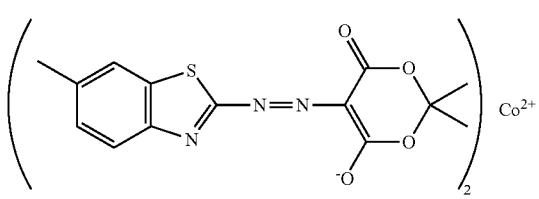

Structural formula (42)

The recording layer was formed such that the optical density (the OD value) was 0.25 at a maximum absorption wavelength (λmax=370 nm).

Waterproofness of the organic dye represented by the above-described structural formula (42) was evaluated. The remaining percentage of the dye was 24 wt %, which had low waterproofness.

In the optical recording medium comparative sample No. 12 thus prepared, data was recorded and reproduced similar to Example 1. The optimum laser power was 8.6 mW.

Next, by fixing the power of the laser beam to 0.35 mW, the data recorded on the optical recording medium comparative sample No. 12 was reproduced and the reproduction signal was evaluated. The DC jitter was 8.9%.

Further, an entire surface of the optical recording medium comparative sample No. 12 was irradiated with the laser beam having the power 10% higher than the optimum laser power, and the data was recorded over the entire surface of the optical recording medium comparative sample No. 12. The high temperature and high humidity test conforming to ISO was conducted. After the high temperature and high humidity test, the entire surface of the optical recording medium comparative sample No. 12 was observed with a microscope. A delamination diameter of 10 micrometers to 3 millimeters was observed between the protective layer and the recording layer at 478 points.

Comparative Example 13

An optical recording medium comparative sample No. 13 was prepared similar to Example 1 except that 10 wt % of the organic dye represented by the following structural formula (43) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 34]

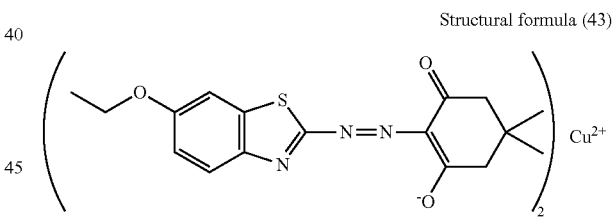

Structural formula (43)

The recording layer was formed such that the optical density (the OD value) was 0.25 at a maximum absorption wavelength (λmax=370 nm).

Waterproofness of the organic dye represented by the above-described structural formula (43) was evaluated. The remaining percentage of the dye was 50 wt %, which had low waterproofness.

In the optical recording medium comparative sample No. 13 thus prepared, data was recorded and reproduced similar to Example 1. The optimum laser power was 8.4 mW.

Next, by fixing the power of the laser beam to 0.35 mW, the data recorded on the optical recording medium comparative sample No. 13 was reproduced and the reproduction signal was evaluated. The DC jitter was 9.4%.

Further, an entire surface of the optical recording medium comparative sample No. 13 was irradiated with the laser beam having the power 10% higher than the optimum laser power, and the data was recorded over the entire surface of the optical recording medium comparative sample No. 13. The high temperature and high humidity test conforming to ISO was conducted. After the high temperature and high humidity test, the entire surface of the optical recording medium comparative sample No. 13 was observed with a microscope. A delamination diameter of 10 micrometers to 3 millimeters was observed between the protective layer and the recording layer at 137 points.

Comparative Example 14

An optical recording medium comparative sample No. 14 was prepared similar to Example 1 except that 10 wt % of the organic dye represented by the following structural formula (44) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 35]

Structural formula (44)

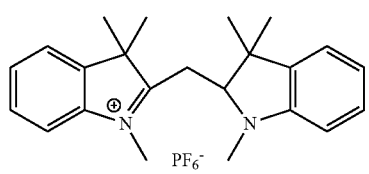

The recording layer was formed such that the optical density (the OD value) was 0.25 at a maximum absorption wavelength ($\lambda$max=370 nm).
Waterproofness of the organic dye represented by the above-described structural formula (44) was evaluated. The remaining percentage of the dye was 18 wt %, which had low waterproofness.
In the optical recording medium comparative sample No. 14 thus prepared, data was recorded and reproduced similar to Example 1. The optimum laser power was 8.6 mW.
Next, by fixing the power of the laser beam to 0.35 mW, the data recorded on the optical recording medium comparative sample No. 14 was reproduced and the reproduction signal was evaluated. The DC jitter was 9.1%.
Further, an entire surface of the optical recording medium comparative sample No. 14 was irradiated with the laser beam having the power 10% higher than the optimum laser power, and the data was recorded over the entire surface of the optical recording medium comparative sample No. 14. The high temperature and high humidity test conforming to ISO was conducted. After the high temperature and high humidity test, the entire surface of the optical recording medium comparative sample No. 14 was observed with a microscope. A delamination diameter of 10 micrometers to 3 millimeters was observed between the protective layer and the recording layer at 688 points.

Comparative Example 15

An optical recording medium comparative sample No. 15 was prepared similar to Example 1 except that 10 wt % of the organic dye represented by the following structural formula (45) in place of the organic dye represented by the above-described structural formula (11) was added to and mixed with 90 wt % of the triazole-based azo metal complex dye represented by the above-described structural formula (21), which was dissolved into 2,2,3,3-tetrafluoro-1-propanol (TFP) to prepare an organic dye solution.

[Chemical formula 36]

Structural formula (45)

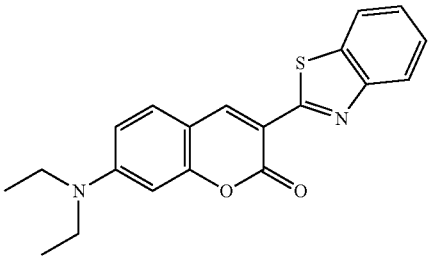

The recording layer was formed such that the optical density (the OD value) was 0.25 at a maximum absorption wavelength ($\lambda$max=370 nm).
Waterproofness of the organic dye represented by the above-described structural formula (45) was evaluated. The remaining percentage of the dye was 0 wt %.
In the optical recording medium comparative sample No. 15 thus prepared, data was recorded and reproduced similar to Example 1. The optimum laser power was 8.6 mW.
Next, by fixing the power of the laser beam to 0.35 mW, the data recorded on the optical recording medium comparative sample No. 15 was reproduced and the reproduction signal was evaluated. The DC jitter was 8.8%
Further, an entire surface of the optical recording medium comparative sample No. 15 was irradiated with the laser beam having the power 10% higher than the optimum laser power, and the data was recorded over the entire surface of the optical recording medium comparative sample No. 15. The high temperature and high humidity test conforming to ISO was conducted. After the high temperature and high humidity test, the entire surface of the optical recording medium comparative sample No. 15 was observed with a microscope. A delamination diameter of 10 micrometers to 3 millimeters was observed between the protective layer and the recording layer at 556 points.
In Examples 1 to 9, 10 wt % of the organic dye represented by the structural formula (11) having waterproofness (the remaining percentage of the dye) of 80 wt % was added to and mixed with 90 wt % of the triazole-based azo metal complex dye represented by any of the structural formulae (21) to (29), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that each of the resultant optical recording medium samples Nos. 1 to 9 had low optimum laser power and low DC jitter, had not more than 46 points having the delamination diameter of 10 micrometers to 3 millimeters between the protective layer and the recording layer after the high temperature and high humidity test, and had less degradation of the recording/reproduction characteristics even when the light transmission layer was a single layer and stored in high-temperature/high-moisture conditions.
In Examples 10 to 17, 10 wt % of the organic dye represented by any the structural formulae (12) to (19) having waterproofness (the remaining percentage of the dye) of 62 wt % to 95 wt % was added to and mixed with 90 wt % of the triazole-based azo metal complex dye represented by the structural formula (21), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that each of the resultant optical recording medium samples Nos. 10 to 17 had low optimum laser power and low DC jitter, had not more than 54 points having the delamination diameter of 10 micrometers to 3 millimeters between the protective layer and the recording layer after the high temperature and high humidity test, and had less degradation of the recording/reproduction characteristics even when the light transmission layer was a single layer and stored in high-temperature/high-moisture conditions.

In Examples 18 to 21, 25 wt % to 3 wt % of the organic dye represented by the structural formula (11) having waterproofness (the remaining percentage of the dye) of 80 wt % was added to and mixed with 75 wt % to 97 wt % of the triazole-based azo metal complex dye represented by the structural formula (21), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that there were 14 points to 105 points having the delamination diameter of 10 micrometers to 3 millimeters between the protective layer and the recording layer after the high temperature and high humidity test, and the recording/reproduction characteristics were less degraded even when the light transmission layer was a single layer and stored in high-temperature/high-moisture conditions.

In Examples 22 to 34, 3 wt % or more and 20 wt % or less of the organic dye represented by any of the structural formulae (11) to (15) and (18) having waterproofness (the remaining percentage of the dye) of 62 wt % to 93 wt % was added to and mixed with the triazole-based azo metal complex dye represented by any of the structural formulae (23) to (27), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that each of the resultant optical recording medium samples Nos. 22 to 34 had low optimum laser power and low DC jitter, had not more than 80 points having the delamination diameter of 10 micrometers to 3 millimeters between the protective layer and the recording layer after the high temperature and high humidity test, and had less degradation of the recording/reproduction characteristics even when the light transmission layer was a single layer and stored in high-temperature/high-moisture conditions.

On the other hand, in Comparative Examples 1 to 9, no organic dye having waterproofness was added to 25 wt % to 44 wt % of the triazole-based azo metal complex dye represented by any of the structural formulae (21) to (29) having waterproofness (the remaining percentage of the dye), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that each of the resultant optical recording medium comparative samples Nos. 1 to 9 had low optimum laser power and low DC jitter, had good recording/reproduction characteristics, but had 116 to 246 points having the delamination diameter of 10 micrometers to 3 millimeters between the protective layer and the recording layer after the high temperature and high humidity test, and had significant degradation of the recording/reproduction characteristics when the light transmission layer was stored in high-temperature/high-moisture conditions.

In Comparative Examples 10 to 15, 10 wt % of the organic dye represented by any of the structural formulae (40) to (45) having waterproofness (the remaining percentage of the dye) of 0 wt % to 50 wt % was added to 90 wt % of the triazole-based azo metal complex dye represented by the formula (21), which was dissolved into 2,2,3,3-tetrafluoro-1-propanol (TFP) to prepare an organic dye solution, and the organic dye solution prepared was coated over the surface of the reflective layer by the spin coating method to form the recording layer. It was found that as each of the organic dye represented by the formulae (40) to (45) was highly hydrophilic and low waterproof, there were a great number of points having the delamination diameter of 10 micrometers to 3 millimeters between the protective layer and the recording layer after the high temperature and high humidity test, and the recording/reproduction characteristics were significantly degraded when the light transmission layer was stored in high-temperature/high-moisture conditions.

The present invention is not limited to the above described embodiments and examples, variations and modifications may be made within the scope of the claimed invention, and it should be appreciated that they are also encompassed by the present invention.

For example, in the above-described embodiments and examples, the light transmission layer 14 is formed by coating the surface of the protective layer 13 with the photocurable resin, which is cured by irradiating ultraviolet rays or radiation, by the spin coating method to form the coated film, and by irradiating the coated film with ultraviolet rays or radiation to cure the coated film. However, the light transmission layer 14 is not necessarily formed in this way. The light transmission layer 14 may be formed by adhering a light transmission resin film to the surface of the protective layer 13 using an adhesive.

DESCRIPTION OF SYMBOLS

1 recordable optical recording medium

5 laser beam

10 substrate

10a guide groove

11 reflective layer

12 recording layer

13 protective layer

14 light transmission layer

15 hard coat layer

The invention claimed is:

1. A recordable optical recording medium, comprising
a substrate on which at least a reflective layer, a recording layer and a light transmission layer are provided, characterized in that
the recording layer is formed by adding a low hydrophilic and highly waterproof organic dye to a triazole-based azo metal complex dye represented by the following general formula (1):

[Chemical formula 37]

General formula (1)

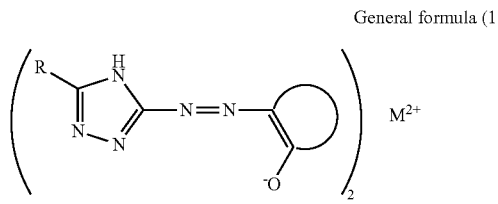

(in the general formula (1), a cyclic part is composed of a carbon atom, an oxygen atom and a hydrogen atom; R is a functional group selected from the group consisting of a hydrogen atom, an alkyl group having four or less carbon atoms, a benzyl group, a diethylamide group, a halogen group, a trifluoro methyl group, a methoxy group, a thiomethyl group and N,N-diethyl carbamoyl group; the alkyl group may have a straight chain alkyl, branched chain alkyl or cyclic structure; and M is a metal atom selected from the group consisting of nickel, cobalt and copper) and using the resultant organic dye, and wherein the low hydrophilic and highly waterproof organic dye added to the triazole-based azo metal complex dye represented by the general formula (1) has an optical density ratio of 60 wt % or more, the ratio being between the optical density being at a maximum absorption wavelength ($\lambda$max) before a dye thin film is immersed into hot water of 75° C. and the optical density being at the maximum absorption wavelength ($\lambda$max) after the dye thin film is immersed into the hot water for 30 minutes.

2. The recordable optical recording medium according to claim 1, characterized in that the cyclic part of the general formula (1) has the structure shown by the following general formula (5):

[Chemical formula 38]

General formula (5)

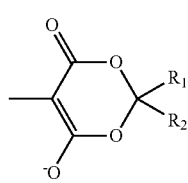

(in the general formula (5), R$_1$ and R$_2$ are each an alkyl group that may have the cyclic structure, and the cyclic structure may have a substituent or substituents).

3. The recordable optical recording medium according to claim 2, characterized in that the cyclic part of the triazole-based azo metal complex dye represented by the general formula (5) has the structure shown by either of the following general formulae (a) to (j):

[Chemical formula 39]

General formula (a)

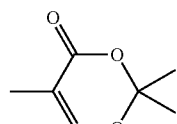

[Chemical formula 40]

General formula (b)

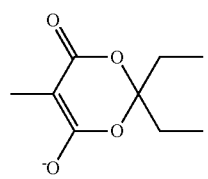

[Chemical formula 41]

General formula (c)

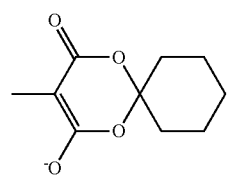

[Chemical formula 42]

General formula (d)

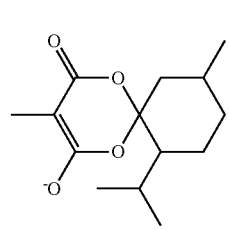

[Chemical formula 43]

General formula (e)

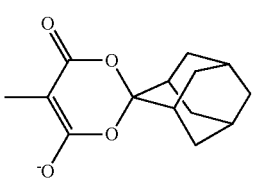

[Chemical formula 44]

General formula (f)

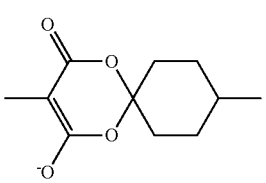

[Chemcial formula 45]

General formula (g)

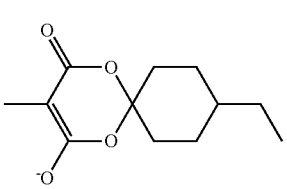

[Chemical formula 46]

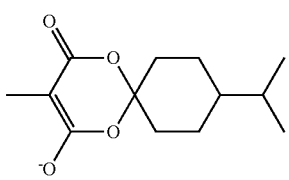

General formua (h)

[Chemical formula 47]

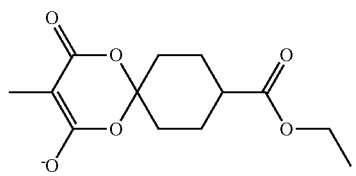

General Formula (i)

[Chemical formula 48]

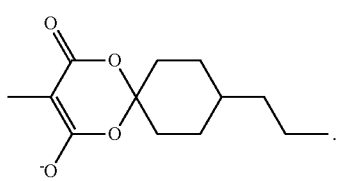

General formula (j)

4. The recordable optical recording medium according to claim 1, characterized in that the low hydrophilic and highly waterproof organic dye added to the triazole-based azo metal complex dye represented by the general formula (1) is selected from the group consisting of the organic dyes represented by the following structural formulae (11) to (19):

[Chemical formula 49]

Structural formula (11)

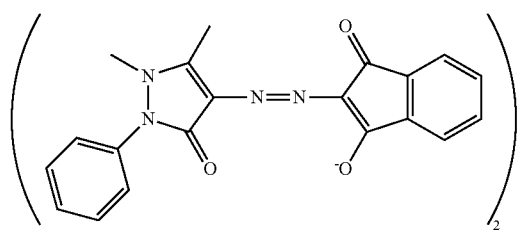

[Chemical formula 50]

Structural formula (12)

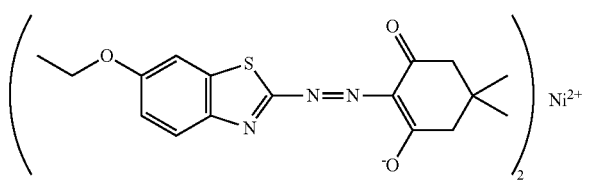

[Chemical formula 51]

Structural formula (13)

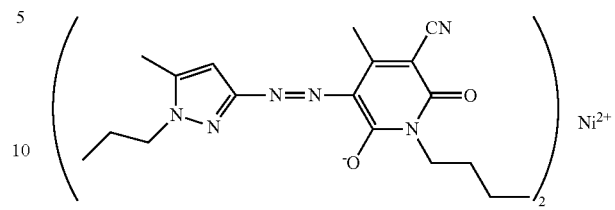

[Chemical formula 52]

Structural formula (14)

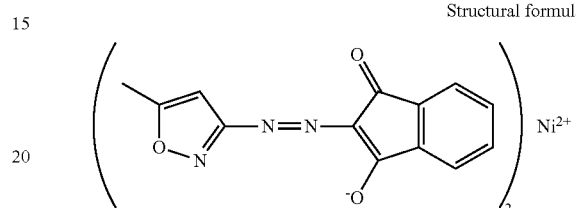

[Chemical formula 53]

Structural formula (15)

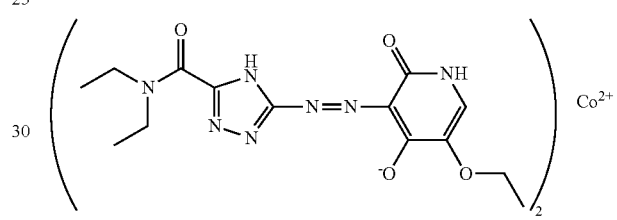

[Chemical formula 54]

Structural formula (16)

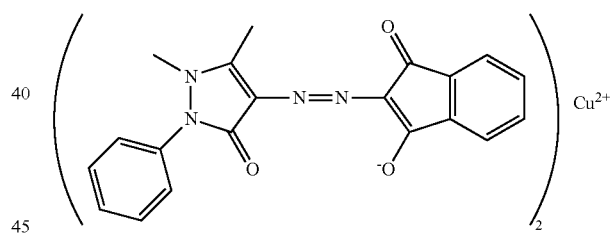

[Chemical formula 55]

Structural formula (17)

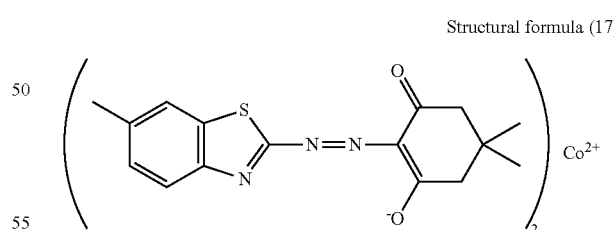

[Chemical formula 56]

Structural formula (18)

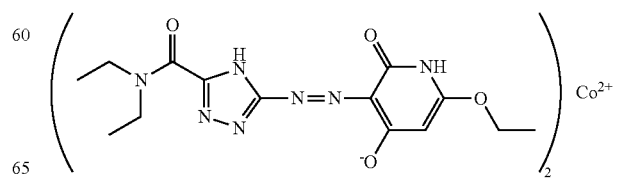

[Chemical formula 57]

Structural formula (19)

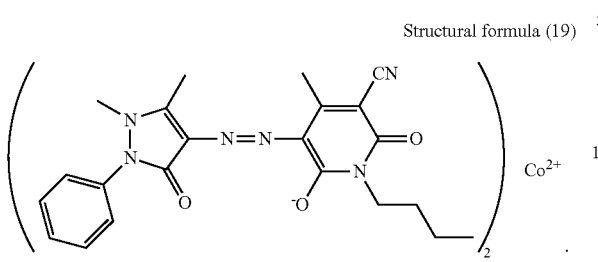

5. The recordable optical recording medium according to claim 1, characterized in that the triazole-based azo metal complex dye has a molecular structure selected from the following structural formulae (21) to (29):

[Chemical formula 58]

Structural formula (21)

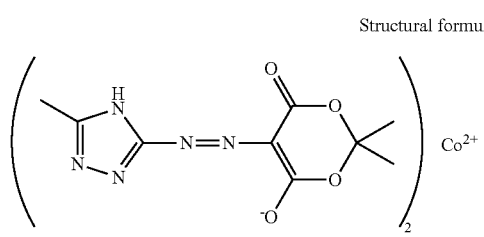

[Chemical formula 59]

Structural formula (22)

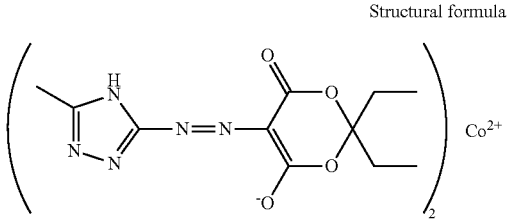

[Chemical formula 60]

Structural formula (23)

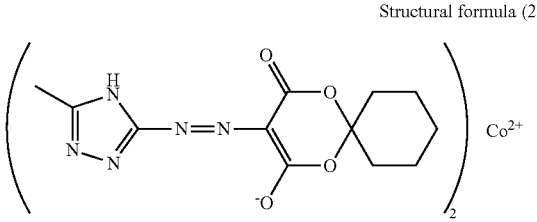

[Chemical formula 61]

Structural formula (24)

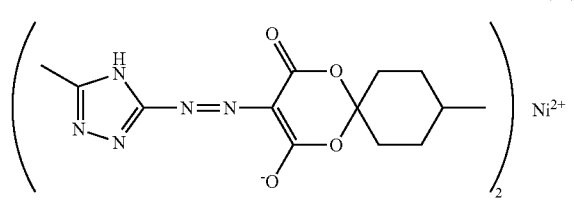

[Chemical formula 62]

Structural formula (25)

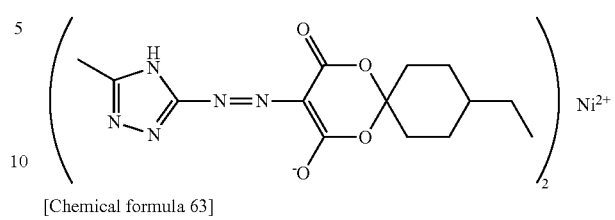

[Chemical formula 63]

Structural formula (26)

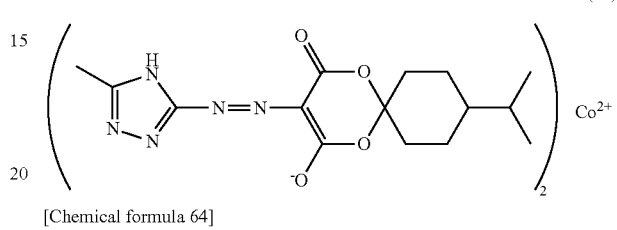

[Chemical formula 64]

Structural formula (27)

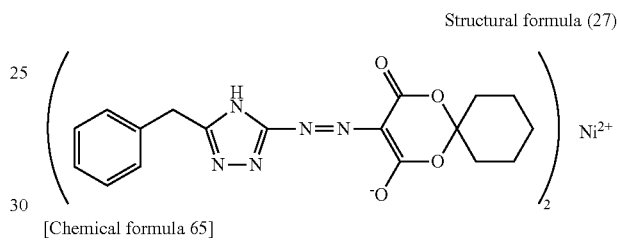

[Chemical formula 65]

Structural formula (28)

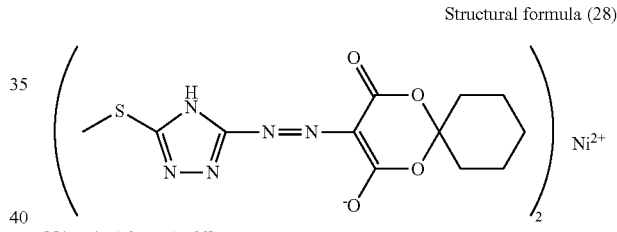

[Chemical formula 66]

Structural formula (29)

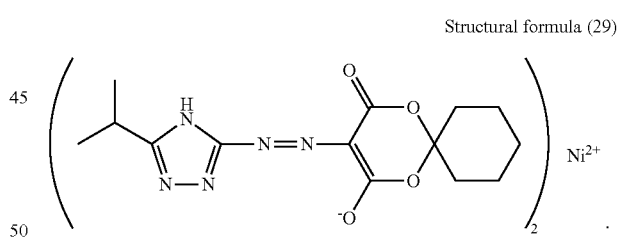

6. The recordable optical recording medium according to claim 1, characterized in that an additive amount of the low hydrophilic and highly waterproof organic dye added to the triazole-based azo metal complex dye represented by the general formula (1) is 3 wt % to 25 wt % based on the total organic dye contained in the recording layer.

7. The recordable optical recording medium according to claim 1, characterized in that the light transmission layer is a single layer.

8. The recordable optical recording medium according to claim 7, characterized in that the single-layered light transmission layer has elastic modulus of 40 MPa or more and 10000 MPa or less at 25° C.

9. The recordable optical recording medium according to claim 1, characterized in that the recordable optical recording medium includes a protective layer formed of a dielectric material between the recording layer and the light transmission layer.

10. The recordable optical recording medium according to claim 1, characterized in that the recordable optical recording medium includes a hard coat layer formed on a surface of the light transmission layer at an opposite side of the protective layer.

* * * * *